United States Patent
Wang et al.

(10) Patent No.: US 12,459,459 B2
(45) Date of Patent: Nov. 4, 2025

(54) SAFETY SYSTEM FOR IMPROVING ROAD COMPATIBILITY OF VEHICLE, VEHICLE SAFETY SYSTEM AND APPARATUS, METHOD, AND MEDIUM

(71) Applicant: ZF ASIA PACIFIC AUTOMOTIVE SAFETY SYSTEMS (SHANGHAI) CO., Shanghai (CN)

(72) Inventors: Hai Wang, Shanghai (CN); Ting Chen, Shanghai (CN); Hui Yang, Shanghai (CN); Zhenfei Wang, Shanghai (CN); Zihong Xu, Shanghai (CN); Yuanyi Cheng, Shanghai (CN)

(73) Assignee: ZF ASIA PACIFIC AUTOMOTIVE SAFETY SYSTEMS (SHANGHAI) CO., Shanghai (CN)

( * ) Notice: Subject to any disclaimer, the term of this patent is extended or adjusted under 35 U.S.C. 154(b) by 244 days.

(21) Appl. No.: 17/917,089

(22) PCT Filed: Apr. 9, 2021

(86) PCT No.: PCT/CN2021/086164
§ 371 (c)(1),
(2) Date: Oct. 5, 2022

(87) PCT Pub. No.: WO2021/204246
PCT Pub. Date: Oct. 14, 2021

(65) Prior Publication Data
US 2023/0150450 A1 May 18, 2023

(30) Foreign Application Priority Data

Apr. 10, 2020 (CN) .......................... 202010277905.9
Apr. 10, 2020 (CN) .......................... 202010278445.1

(51) Int. Cl.
*B60R 21/36* (2011.01)
*B60Q 9/00* (2006.01)
(Continued)

(52) U.S. Cl.
CPC .............. *B60R 21/36* (2013.01); *B60Q 9/008* (2013.01); *B60R 21/013* (2013.01); *B60R 21/0132* (2013.01); *B60R 21/01512* (2014.10)

(58) Field of Classification Search
None
See application file for complete search history.

(56) References Cited

U.S. PATENT DOCUMENTS 7,194,347 B2 * 3/2007 Harumoto ................ G08G 1/16
340/436
7,359,782 B2 * 4/2008 Breed ...................... G01S 7/023
710/48
(Continued)

FOREIGN PATENT DOCUMENTS

CN 103043021 A 4/2013
CN 103863233 A 6/2014
(Continued)

OTHER PUBLICATIONS

International Search Report and Written Opinion for PCT/CN2021/086164 mailed Jul. 8, 2021 (9 pages; with English translation).

*Primary Examiner* — Kevin R Steckbauer
(74) *Attorney, Agent, or Firm* — Tarolli, Sundheim, Covell & Tummino LLP

(57) ABSTRACT

A safety system for improving road compatibility of a vehicle includes a monitoring system and an integrated safety domain control unit. The monitoring system includes a vehicle external information monitoring module and a vehicle body posture monitoring module. The integrated safety domain control unit is configured to compute a collision condition between the vehicle and an obstacle
(Continued)

based on data acquired by the vehicle external information monitoring module and the vehicle body posture monitoring module, the collision condition including a collision relative speed and a collision overlap rate, and determine, based on the collision relative speed and the collision overlap rate, whether to deploy an external airbag. A determination condition for controlling triggering of deployment of the external airbag includes determining whether the collision relative speed is less than a first speed threshold and/or whether the collision overlap rate is less than a first overlap rate threshold. The present disclosure further relates to a safety apparatus and method for improving road compatibility of a vehicle, and a medium, as well as a vehicle safety system, a vehicle safety apparatus, a method for enhancing safety of a vehicle, and a readable storage medium.

16 Claims, 8 Drawing Sheets

(51) Int. Cl.
  *B60R 21/013* (2006.01)
  *B60R 21/0132* (2006.01)
  *B60R 21/015* (2006.01)

(56) References Cited

U.S. PATENT DOCUMENTS

| | | | | |
|---|---|---|---|---|
| 7,543,677 B2* | 6/2009 | Igawa | .................. | B60R 21/0134 280/735 |
| 7,630,806 B2* | 12/2009 | Breed | .................. | B60R 21/0134 701/45 |
| 7,783,403 B2* | 8/2010 | Breed | .................. | G01S 7/0234 340/995.13 |
| 8,041,483 B2* | 10/2011 | Breed | .................. | G01S 7/023 348/148 |
| 8,172,024 B2* | 5/2012 | Seo | .................. | B60R 21/0134 701/45 |
| 8,447,474 B2* | 5/2013 | Breed | .................. | G01S 17/931 345/9 |
| 8,583,329 B2* | 11/2013 | Breed | .................. | B60R 21/0134 180/197 |
| 8,880,296 B2* | 11/2014 | Breed | .................. | B60R 19/205 180/170 |
| 9,102,305 B2* | 8/2015 | Kim | .................. | B60R 21/0136 |
| 9,139,149 B2* | 9/2015 | Lee | .................. | B60R 21/013 |
| 9,381,882 B2* | 7/2016 | Kim | .................. | B60R 21/0134 |
| 11,820,320 B2* | 11/2023 | Yang | .................. | B60R 21/263 |
| 2004/0193347 A1* | 9/2004 | Harumoto | .............. | G08G 1/166 701/45 |
| 2004/0254729 A1* | 12/2004 | Browne | .................. | G01S 13/931 701/45 |
| 2005/0278098 A1* | 12/2005 | Breed | .................. | B60K 35/28 701/45 |
| 2006/0213714 A1* | 9/2006 | Igawa | .................. | B60R 21/0134 180/274 |
| 2008/0040004 A1* | 2/2008 | Breed | .................. | G01S 7/023 701/45 |
| 2008/0046150 A1* | 2/2008 | Breed | .................. | B60R 21/0134 701/45 |
| 2008/0119993 A1* | 5/2008 | Breed | .................. | G01S 7/023 701/45 |
| 2009/0010495 A1* | 1/2009 | Schamp | .................. | G06F 18/254 382/106 |
| 2009/0167005 A1* | 7/2009 | Oowada | .............. | B60R 21/0136 280/735 |
| 2010/0057305 A1* | 3/2010 | Breed | .................. | B60R 21/0134 701/45 |
| 2011/0101661 A1* | 5/2011 | Seo | .................. | B60R 21/0134 280/735 |
| 2011/0295467 A1* | 12/2011 | Browne | .................. | G01S 13/87 701/46 |
| 2013/0250112 A1* | 9/2013 | Breed | .................. | G01S 17/931 348/148 |
| 2014/0063255 A1* | 3/2014 | Breed | .................. | B60R 19/205 348/148 |
| 2014/0156146 A1* | 6/2014 | Lee | .................. | B60R 21/0132 701/45 |
| 2014/0277950 A1* | 9/2014 | Kim | .................. | B60R 21/0136 701/45 |
| 2014/0303882 A1* | 10/2014 | Jang | .................. | G08G 1/09675 701/119 |
| 2015/0158446 A1* | 6/2015 | Lee | .................. | B60R 21/013 701/45 |
| 2016/0362080 A1* | 12/2016 | Kim | .................. | B60R 21/0134 |
| 2020/0216062 A1* | 7/2020 | Hakki | .................. | B60W 30/09 |
| 2020/0307481 A1* | 10/2020 | Yezersky | .............. | B60R 21/013 |
| 2021/0078598 A1* | 3/2021 | Kim | .................. | B60W 10/18 |
| 2022/0092891 A1* | 3/2022 | Bengad | ................ | G07C 5/0808 |
| 2023/0131504 A1* | 4/2023 | Xu | .................. | B60R 21/0134 701/45 |
| 2023/0142012 A1* | 5/2023 | Yang | .................. | B60R 21/0134 701/45 |
| 2023/0150450 A1* | 5/2023 | Wang | .................. | B60R 21/0132 701/45 |
| 2024/0166204 A1* | 5/2024 | Schaefer | ................ | G08G 1/166 |

FOREIGN PATENT DOCUMENTS

| | | | | |
|---|---|---|---|---|
| CN | 105083193 A | | 11/2015 | |
| CN | 206633959 U | | 11/2017 | |
| CN | 109733317 A | | 5/2019 | |
| CN | 110816464 A | | 2/2020 | |
| CN | 212556151 U | * | 2/2021 | |
| CN | 113511157 A | * | 10/2021 | ......... B60R 21/0134 |
| CN | 113511159 A | * | 10/2021 | ........... B60R 21/263 |
| CN | 113511160 A | * | 10/2021 | ......... B60R 21/0132 |
| CN | 113511166 A | * | 10/2021 | ............. B60R 21/26 |
| CN | 113511167 A | * | 10/2021 | ......... B60R 21/0132 |
| CN | 113511168 A | * | 10/2021 | ......... B60R 21/0132 |
| CN | 113511170 A | * | 10/2021 | ............. B60N 2/002 |
| CN | 114379492 A | * | 4/2022 | ......... B60R 21/0134 |
| CN | 113511160 B | * | 10/2022 | ......... B60R 21/0134 |
| CN | 113511166 B | * | 10/2022 | ......... B60R 21/2334 |
| CN | 113511168 B | * | 10/2022 | ............. B60R 21/01 |
| CN | 113511170 B | * | 10/2022 | ............. B60W 40/08 |
| CN | 113511157 B | * | 1/2023 | ......... B60R 21/0134 |
| CN | 113511159 B | * | 1/2023 | ........... B60R 21/263 |
| CN | 113511167 B | * | 1/2023 | ............. B60R 21/36 |
| CN | 116639151 A | * | 8/2023 | ......... B60W 60/001 |
| CN | 116639151 B | * | 11/2023 | ......... B60W 60/001 |
| DE | 102021206383 A1 | * | 4/2022 | ....... B60R 21/01538 |
| DE | 112021003774 T5 | * | 10/2023 | ........... B60N 2/0278 |
| EP | 3378707 A1 | | 9/2018 | |
| EP | 4134282 A1 | * | 2/2023 | ............. B60R 21/36 |
| EP | 4140826 A1 | * | 3/2023 | ........... B60R 21/263 |
| EP | 4144598 A1 | * | 3/2023 | ............. B60N 2/002 |
| JP | 2023522130 A | * | 5/2023 | ......... B60R 21/0134 |
| JP | 2023522131 A | * | 5/2023 | ............. B60R 21/36 |
| KR | 20050027365 A | | 3/2005 | |
| KR | 101082112 B1 | | 11/2011 | |
| WO | WO-2020141485 A1 | * | 7/2020 | ........... G07C 5/0808 |
| WO | WO-2021204228 A1 | * | 10/2021 | ....... B60R 21/01552 |
| WO | WO-2021204229 A1 | * | 10/2021 | ............. B60N 2/002 |
| WO | WO-2021204244 A1 | * | 10/2021 | ......... B60R 21/0132 |
| WO | WO-2021204245 A1 | * | 10/2021 | ......... B60R 21/0132 |
| WO | WO-2021204246 A1 | * | 10/2021 | ............. B60R 21/36 |

* cited by examiner

SAFETY SYSTEM FOR IMPROVING ROAD COMPATIBILITY OF VEHICLE, VEHICLE SAFETY SYSTEM AND APPARATUS, METHOD, AND MEDIUM

CROSS-REFERENCE TO RELATED APPLICATIONS

This application is a national stage of International Application No. PCT/CN2021/086164, filed Apr. 9, 2021, the disclosure of which is incorporated herein by reference in its entirety, and which claims priority to China Patent Application No. 202010278445.1, filed Apr. 10, 2020 and China Patent Application No. 202010277905.9, filed Apr. 10, 2020, the disclosures of which are incorporated herein by reference in their entirety.

TECHNICAL FIELD

The present disclosure relates to the field of vehicle safety, and in particular, to a safety system, apparatus, and method for improving road compatibility of a vehicle, and a readable storage medium, as well as a vehicle safety system, a vehicle safety apparatus, a method for enhancing safety of a vehicle, and a readable storage medium.

BACKGROUND

For vehicle collision accidents, due to the differences in vehicle body heights, weights, vehicle body structures, and even bumper heights and shapes of various vehicles on the road, during vehicle collision accidents, there is necessary one side in an advantageous position and the other side in a disadvantageous position. How to protect safety of one side and reduce damage to the other side in a collision is a principle of road compatibility of a vehicle.

In the prior art, a technical solution for improving the road compatibility of the vehicle is mainly implemented by improving a structural design of the vehicle body, for example, by reducing rigidity of a vehicle head part. In a collision between two vehicles, in addition to reducing impact on a cockpit of one vehicle itself in the collision, it is also possible to absorb an impact force generated by the collision between the two sides, and reduce damage caused to the other side of the collision.

However, the requirements for road compatibility of a vehicle are increasingly high. For example, point penalty requirements for road compatibility have been newly added to the 2021 version of China New Car Assessment Program (CNCAP).

Therefore, there is a need in the art for a safety system, apparatus, and method for improving road compatibility of a vehicle, and a readable storage medium, to further improve road compatibility of the vehicle and meet increasingly strict requirements for road compatibility of the vehicle.

In the field of vehicle safety, protection of a vulnerable road user (VRU) has recently become a hot topic. For example, it is reported that in Europe, vulnerable road users such as pedestrians, bicycles, and motorcycles account for almost half of the total number of traffic deaths, and the number of bicycle traffic deaths is rising in many countries. The test for the VRU has become one of the test contents for the European New Car Assessment Programme (Euro NCAP).

In the prior art, a technical solution for protecting the VRU includes providing a front airbag in the front of a vehicle body, and deploying the front airbag when the front of the vehicle body collides with the VRU, thereby protecting the VRU.

However, the inventors have found that in some collision situations, deploying the front airbag may actually exacerbate damage to the VRU. Therefore, there is a need in the art for a vehicle safety system, a vehicle safety apparatus, a method for enhancing safety of a vehicle, and a readable storage medium to reduce damage to a vulnerable road user in collision with the front of a vehicle body.

SUMMARY

What is needed is a safety system for improving road compatibility of a vehicle.

What is also needed is a vehicle safety apparatus to improve road compatibility of a vehicle.

Still another need in the prior art is a method for improving road compatibility of a vehicle.

Yet another need in the prior art is a computer-readable storage medium that can improve road compatibility of a vehicle.

According to an aspect of the present disclosure, a safety system for improving road compatibility of a vehicle is configured to improve the road compatibility of the vehicle and capable of controlling an external airbag of the vehicle, and includes: a monitoring system including: a vehicle external information monitoring module configured to monitor an obstacle around a vehicle body; and a vehicle body posture monitoring module configured to monitor vehicle body motion and a vehicle body posture; and an integrated safety domain control unit configured to compute a collision condition between the vehicle and the obstacle based on data acquired by the vehicle external information monitoring module and the vehicle body posture monitoring module. The collision condition includes a collision relative speed and a collision overlap rate and determine, based on the collision relative speed and the collision overlap rate, whether to deploy the external airbag, where a determination condition for controlling triggering of deployment of the external airbag includes determining whether the collision relative speed is less than a first speed threshold and/or whether the collision overlap rate is less than a first overlap rate threshold.

In one or more exemplary arrangements, the determination condition for controlling triggering of deployment of the external airbag further includes determining whether deployment of the external airbag in the collision condition reduces damage to the vehicle; and if the deployment of the external airbag in the collision condition does not reduce damage to the vehicle, the integrated safety domain control unit controls the external airbag to keep received.

In one or more exemplary arrangements, the monitoring system further includes an in-vehicle monitoring module configured to acquire mental state data of a driver in the vehicle; and the integrated safety domain control unit computes, based on the mental state data and the data that is acquired by the vehicle external information monitoring module and the vehicle body posture monitoring module, a possibility that the driver notices a collision with the obstacle, and computes the collision condition based on the possibility.

In one or more exemplary arrangements, the integrated safety domain control unit is further configured to give an alarm prompt, and if the possibility is less than an alarm threshold, the integrated safety domain control unit outputs an alarm signal, to increase the possibility that the driver notices a collision with the obstacle.

In one or more exemplary arrangements, the in-vehicle monitoring module includes a camera and/or an in-vehicle radar.

In one or more exemplary arrangements, the mental state data includes one or a combination of health state data and facial data of the driver in the vehicle.

In one or more exemplary arrangements, the monitoring system further includes an Internet of Vehicles module, and the Internet of Vehicles module together with the vehicle external information monitoring module provides information about the obstacle around the vehicle.

In one or more exemplary arrangements, the vehicle external information monitoring module includes one or a combination of a millimeter wave radar, an ultrasonic radar, a laser radar, and an external camera.

In one or more exemplary arrangements, the vehicle body posture monitoring module includes a speed sensor, a yaw velocity sensor, and a steering wheel angle sensor, where the speed sensor is configured to monitor the vehicle body motion, and the yaw velocity sensor and the steering wheel angle sensor are configured to monitor the vehicle body posture.

In one or more exemplary arrangements, the integrated safety domain control unit obtains, through computation, a monitoring area based on data acquired by the vehicle body posture monitoring module, and the vehicle external information monitoring module monitors only an obstacle in the monitoring area.

In one or more exemplary arrangements, the integrated safety domain control unit is further configured to model an obstacle based on monitoring information of the vehicle external information monitoring module, model the vehicle body based on monitoring information of the vehicle body posture monitoring module, and compute the collision condition based on modelling information.

In one or more exemplary arrangements, the safety system further includes a cloud database and a simulation database, where the cloud database is configured to provide historical data of a collision between an obstacle and the vehicle, and the simulation database is configured to provide simulation data of a collision between an obstacle and the vehicle based on the modelling information; and the integrated safety domain control unit computes the collision condition based on the historical data and the simulation data.

According to another aspect of the present disclosure, a vehicle safety apparatus includes an external airbag and the safety system as described in any one of the above.

According to still another aspect of the present disclosure, a method for improving road compatibility of a vehicle, the vehicle including an external airbag, the method including:
monitoring an obstacle around the vehicle and acquiring data of the obstacle around the vehicle;
monitoring vehicle body motion and a vehicle body posture, and acquiring vehicle body posture data and vehicle body motion data;
computing a collision condition between the vehicle and the obstacle based on the data of the obstacle around the vehicle, the vehicle body motion data, and the vehicle body posture data, the collision condition including a collision relative speed and a collision overlap rate; and
determining, based on the collision relative speed and the collision overlap rate, whether to deploy the external airbag, where a determination condition for controlling triggering of deployment of the external airbag includes: if the collision relative speed is less than a first speed threshold and/or the collision overlap rate is less than a first overlap rate threshold, controlling the external airbag to keep received, instead of triggering the external airbag to be deployed.

In one or more exemplary arrangements, the determination condition for controlling triggering of deployment of the external airbag further includes determining whether deployment of the external airbag in the collision condition reduces a damage value to the vehicle; and if the deployment of the external airbag in the collision condition does not reduce the damage value to the vehicle, controlling the external airbag to keep received.

In one or more exemplary arrangements, the monitoring an obstacle around the vehicle includes monitoring whether the obstacle exists around the vehicle, identifying a type of the obstacle, and predicting movement of the obstacle.

In one or more exemplary arrangements, the method further includes: monitoring a mental state of a driver in the vehicle, and acquiring mental state data of the driver in the vehicle; and computing, based on the state data, the data of the obstacle around the vehicle, the vehicle body motion data, and the vehicle body posture data, a possibility that the driver notices a collision with the obstacle, and computing the collision condition based on the possibility.

In one or more exemplary arrangements, the method further includes: recording and uploading the collision condition to a cloud database.

According to yet another aspect of the present disclosure, a computer-readable storage medium stores a computer program thereon, where when the program is executed by a processor, the following steps are implemented:
computing a collision condition between a vehicle and an obstacle based on data of the obstacle around the vehicle, vehicle body motion data, and vehicle body posture data that are input, the collision condition including a collision relative speed and a collision overlap rate; and
determining, based on the collision relative speed and the collision overlap rate, whether to trigger deployment of an external airbag, where a determination condition therefor includes: if the collision relative speed is less than a first speed threshold and/or the collision overlap rate is less than a first overlap rate threshold, controlling the external airbag to keep received, instead of triggering the external airbag to be deployed.

The beneficial effects of the above-mentioned safety system for improving road compatibility of the vehicle, vehicle safety system and apparatus, method and medium include but are not limited to the following:

1. The collision relative speed and the collision overlap rate are used as determination conditions to determine whether to deploy the external airbag, where the external airbag does not need to be deployed if either of the collision relative speed being less than the first speed threshold and the collision overlap rate being less than the first overlap rate threshold is met. In this way, the external airbag can be configured to improve road compatibility in a more targeted manner to avoid danger caused by false triggering of the external airbag.
2. The vehicle external information monitoring module, the in-vehicle monitoring module, and the vehicle body posture monitoring module are provided so that the collision condition is computed by fusing mental state information of the driver, vehicle external information, and vehicle body posture, so that the triggering and deployment timing of the external airbag is more accurate.

3. A simulation database and a cloud historical collision database are used to more accurately compute the collision condition. In addition, the collision data is uploaded, and the database itself has a learning capability. This can continuously improve the accuracy of computation.

Exemplary arrangements of the present disclosure allows for a vehicle safety system to reduce damage to a vulnerable road user in collision with the front of a vehicle body.

Exemplary arrangements of the disclosure allow for a vehicle safety apparatus to reduce damage to a vulnerable road user in collision with the front of a vehicle body.

Exemplary arrangements of the disclosure also provide a method for enhancing safety of a vehicle to reduce damage to a vulnerable road user in collision with the front of a vehicle body.

Exemplary arrangements of the disclosure also provide a computer-readable storage medium that can reduce damage to a vulnerable road user in collision with the front of a vehicle body.

According to an aspect of the present disclosure, a vehicle safety system is configured to reduce damage to a vulnerable road user in collision with the front of a vehicle body, the vehicle safety system is capable of controlling a front airbag of a vehicle, and the vehicle safety system includes: a monitoring system including: a vulnerable-road-user information monitoring module configured to monitor the vulnerable road user around the vehicle; and a vehicle body posture monitoring module configured to monitor vehicle body motion and a posture of the front of the vehicle body; and an integrated safety domain control unit configured to compute a collision condition between the vehicle and the vulnerable road user based on data acquired by the vulnerable-road-user information monitoring module and the vehicle body posture monitoring module, the collision condition including a collision probability, a collision moment, a relative speed at the time of the collision, and a collision position between the head of the vulnerable road user and the front of the vehicle body at the time of the collision, and compute a first damage value and a second damage value to the vulnerable road user in the collision condition based on the collision condition, to determine whether to deploy the front airbag before the collision moment, where the first damage value is a damage value to the vulnerable road user for the front airbag being received in the collision condition, and the second damage value is a damage value to the vulnerable road user for the front airbag being deployed in the collision condition; when the first damage value is greater than the second damage value, the front airbag is controlled to trigger deployment; and when the first damage value is less than the second damage value, the front airbag is controlled to keep received.

In one or more exemplary arrangements, the first damage value includes a third damage value caused by a first collision position between the head of the vulnerable road user and the front of the vehicle body when the front airbag is in a received state at the time of the collision; and the second damage value includes a sum of a fourth damage value caused by a second collision position between the head of the vulnerable road user and the front of the vehicle body when the front airbag is in a deployed state at the moment of the collision and a fifth damage value caused by impact energy to the vulnerable road user at the time of the front airbag being triggered to be deployed minus a damage reduction value to the vulnerable road user caused by impact energy being absorbed due to the deployment of the front airbag.

In one or more exemplary arrangements, the monitoring system further includes an in-vehicle monitoring module configured to acquire mental state data of a driver in the vehicle; and the integrated safety domain control unit computes, based on the mental state data and the data that is acquired by the vulnerable-road-user information monitoring module and the vehicle body posture monitoring module, a possibility that the driver notices a collision with the vulnerable road user, and computes the collision condition based on the possibility.

In one or more exemplary arrangements, the integrated safety domain control unit is further configured to give an alarm prompt, and if the possibility is less than an alarm threshold, the integrated safety domain control unit outputs an alarm signal, to increase the possibility that the driver notices a collision with the vulnerable road user.

In one or more exemplary arrangements, the in-vehicle monitoring module includes a camera and/or an in-vehicle radar.

In one or more exemplary arrangements, the mental state data includes one or a combination of health state data and facial data of the driver in the vehicle.

In one or more exemplary arrangements, the monitoring system further includes an Internet of Vehicles module, and the Internet of Vehicles module together with the vulnerable-road-user information monitoring module provides information about the vulnerable road user around the vehicle.

In one or more exemplary arrangement, the vulnerable-road-user information monitoring module includes one or a combination of a millimeter wave radar, an ultrasonic radar, a laser radar, and an external camera.

In one or more exemplary arrangements, the vehicle body posture monitoring module includes a speed sensor, a yaw velocity sensor, and a steering wheel angle sensor, where the speed sensor is configured to monitor the vehicle body motion, and the yaw velocity sensor and the steering wheel angle sensor are configured to monitor the posture of the front of the vehicle body.

In one or more exemplary arrangements, the integrated safety domain control unit obtains, through computation, a monitoring area based on data acquired by the vehicle body posture monitoring module, and the vulnerable-road-user information monitoring module monitors only the vulnerable road user in the monitoring area.

In one or more exemplary arrangements, the integrated safety domain control unit is further configured to model a vulnerable road user based on monitoring information of the vulnerable-road-user information monitoring module, model the vehicle body based on monitoring information of the vehicle body posture monitoring module, and compute the collision condition based on modelling information.

In one or more exemplary arrangements, the vehicle safety system further includes a cloud database and a simulation database, where the cloud database is configured to provide historical data of a collision between a vulnerable road user and the front of a vehicle body, and the simulation database is configured to provide simulation data of a collision between a vulnerable road user and the front of a vehicle body based on the modelling information; and the integrated safety domain control unit computes the collision condition based on the historical data and the simulation data.

According to another aspect of the present disclosure, a vehicle safety apparatus includes a front airbag and the vehicle safety system as described in any one of the above.

According to still another aspect of the present disclosure, a method for enhancing safety of a vehicle is used to reduce damage to a vulnerable road user in collision with the front of a vehicle body, the vehicle including a front airbag, the method including:

monitoring the vulnerable road user around the vehicle;

monitoring vehicle body motion and a posture of the front of the vehicle body;

computing a collision condition between the vehicle and the vulnerable road user based on the monitored vulnerable road user around the vehicle, vehicle body motion, and posture of the front of the vehicle body, the collision condition including a collision probability, a collision moment, a relative speed at the time of the collision, and a collision position between the head of the vulnerable road user and the front of the vehicle body at the time of the collision; and computing a first damage value and a second damage value to the vulnerable road user in the collision condition, to determine whether to deploy the front airbag before the collision moment, where the first damage value is a damage value to the vulnerable road user for the front airbag being received in the collision condition, and the second damage value is a damage value to the vulnerable road user for the front airbag being deployed in the collision condition; when the first damage value is greater than the second damage value, the front airbag is deployed; and when the first damage value is less than the second damage value, the front airbag is controlled to keep received.

In one or more exemplary arrangements, the first damage value includes a third damage value caused by a first collision position between the head of the vulnerable road user and the front of the vehicle body when the front airbag is in a received state at the time of the collision; and the second damage value includes a sum of a fourth damage value caused by a second collision position between the head of the vulnerable road user and the front of the vehicle body when the front airbag is in a deployed state at the moment of the collision and a fifth damage value caused by impact energy to the vulnerable road user at the time of the front airbag being triggered to be deployed minus a damage reduction value to the vulnerable road user caused by impact energy being absorbed due to the deployment of the front airbag.

In one or more exemplary arrangements, the monitoring the vulnerable road user around the vehicle includes monitoring whether the vulnerable road user exists around the vehicle, identifying a type of the vulnerable road user, tracking a trajectory of the vulnerable road user, and predicting a movement path of the vulnerable road user.

In one or more exemplary arrangements, the method further includes: recording and uploading the collision condition to a cloud database.

According to yet another aspect of the present disclosure, a computer-readable storage medium stores a computer program thereon, where when the program is executed by a processor, the following steps are implemented:

computing a collision condition between a vehicle and a vulnerable road user based on data of the vulnerable road user around the vehicle, vehicle body motion data, and posture data of the front of a vehicle body that are input, the collision condition including a collision probability, a collision moment, a relative speed at the time of the collision, and a collision position between the head of the vulnerable road user and the front of the vehicle body at the time of the collision;

computing a first damage value and a second damage value to the vulnerable road user in the collision condition, where the first damage value is a damage value to the vulnerable road user for the front airbag being received in the collision condition, and the second damage value is a damage value to the vulnerable road user for the front airbag being deployed in the collision condition;

determining whether to deploy the front airbag before the collision moment, and when the first damage value is greater than the second damage value, controlling the front airbag to be deployed; and when the first damage value is less than the second damage value, controlling the front airbag to keep received.

The beneficial effects of the above-mentioned vehicle safety system and apparatus, method for enhancing safety of a vehicle, and medium include, but are not limited to the following: A deployment strategy of the front airbag is optimized by comparing the first damage value and the second damage value, that is, adaptively deploying the front airbag or keeping the front airbag received for the specific collision condition, to reduce the collision damage between the vulnerable road user and the front of the vehicle body.

BRIEF DESCRIPTION OF DRAWINGS

The specific features and performance of the present disclosure are further given by the following exemplary arrangements and the accompanying drawings thereof.

DETAILED DESCRIPTION

The present disclosure will be further described below with reference to specific exemplary arrangements and accompanying drawings. More details are set forth in the following description to fully understand the present disclosure, but it is apparent that the present disclosure can be implemented in many other manners that are different from those described herein. Those skilled in the art can make similar promotion and deduction according to the practical applications without violating the connotation of the present disclosure, and therefore, the content of the specific exemplary arrangements should not limit the protection scope of the present disclosure.

Meanwhile, the present application uses specific terms to describe the exemplary arrangements of the present application. Orientation terms "inner" and "outer" refer to inside and outside relative to a contour of each component itself, and in addition, "one exemplary arrangement", "an exemplary arrangement", and/or "some exemplary arrangements" mean a feature, structure, or characteristic associated with at least one exemplary arrangement of the present application. Therefore, it should be emphasized and noted that two or more references to "an exemplary arrangement" or "one exemplary arrangement" in various places in this specification does not necessarily indicate the same exemplary arrangement. Furthermore, some features, structures, or characteristics of the one or more exemplary arrangements of the present application may be combined appropriately.

Figure 1:
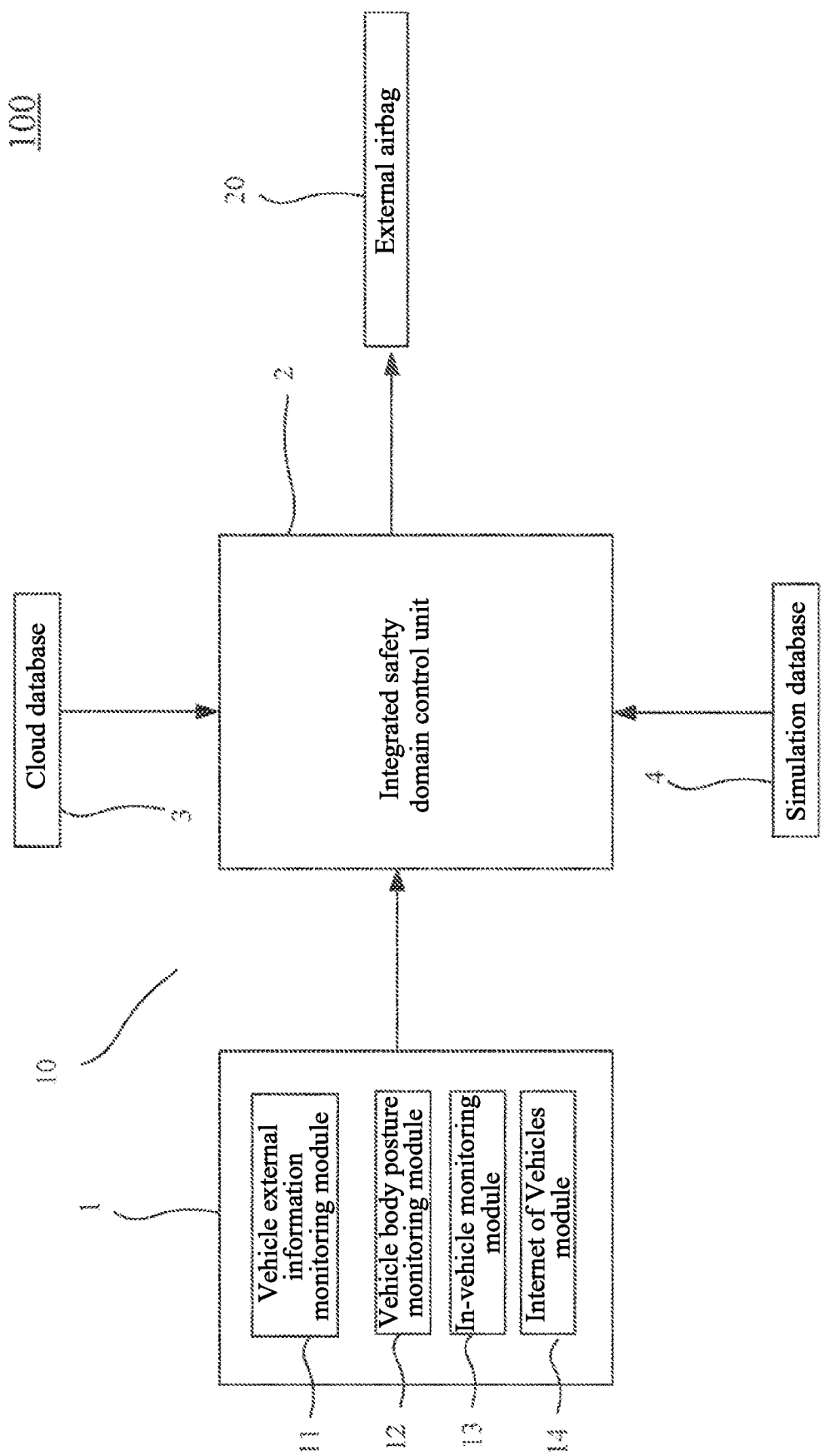
FIG. 1 is a schematic diagram of a safety system according to one or more exemplary arrangements.
Figure 3A:
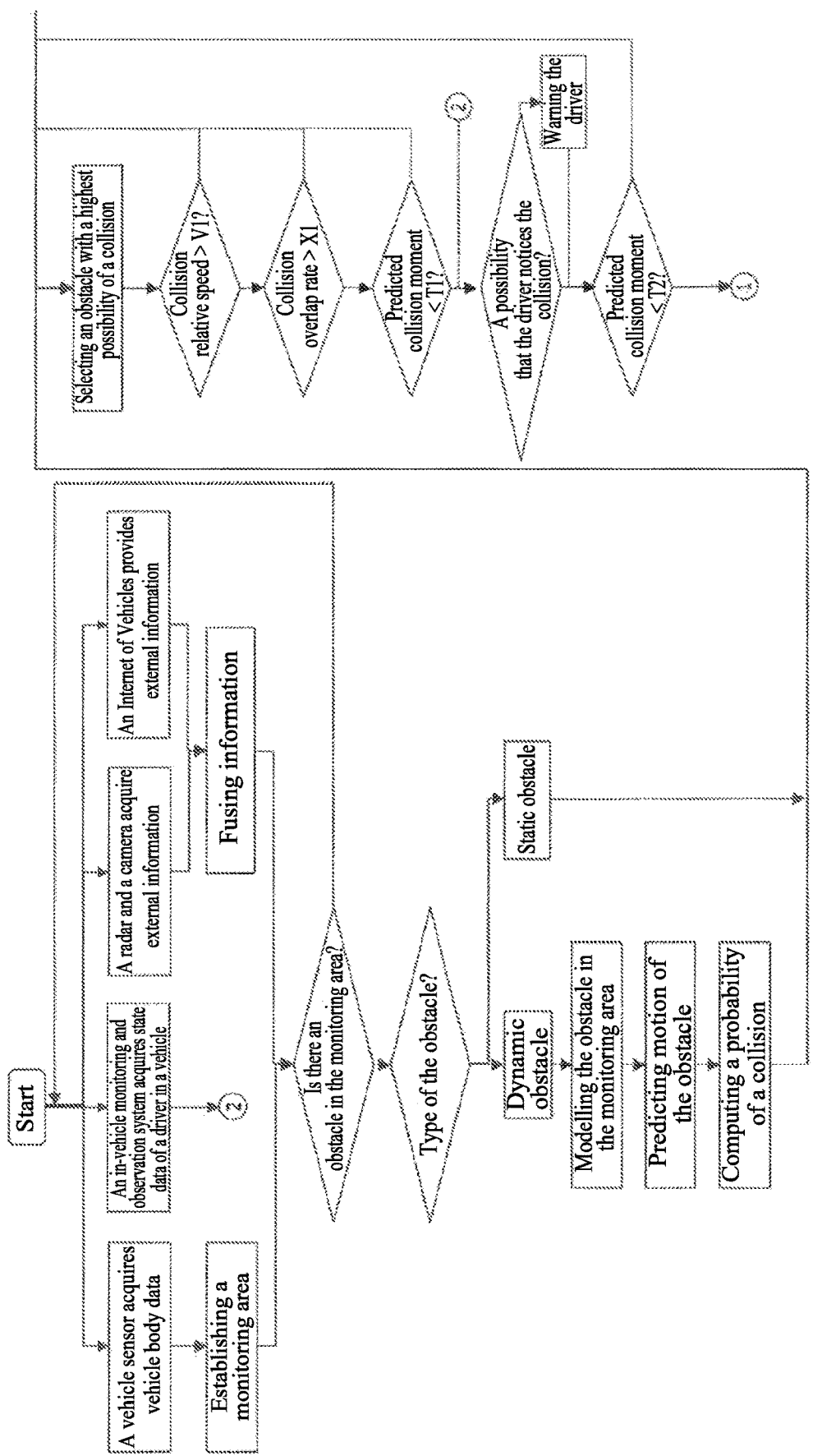
FIGS. 3A and 3B are a flowchart of a method for improving road compatibility of a vehicle according to another exemplary arrangement.
Figure 3B:
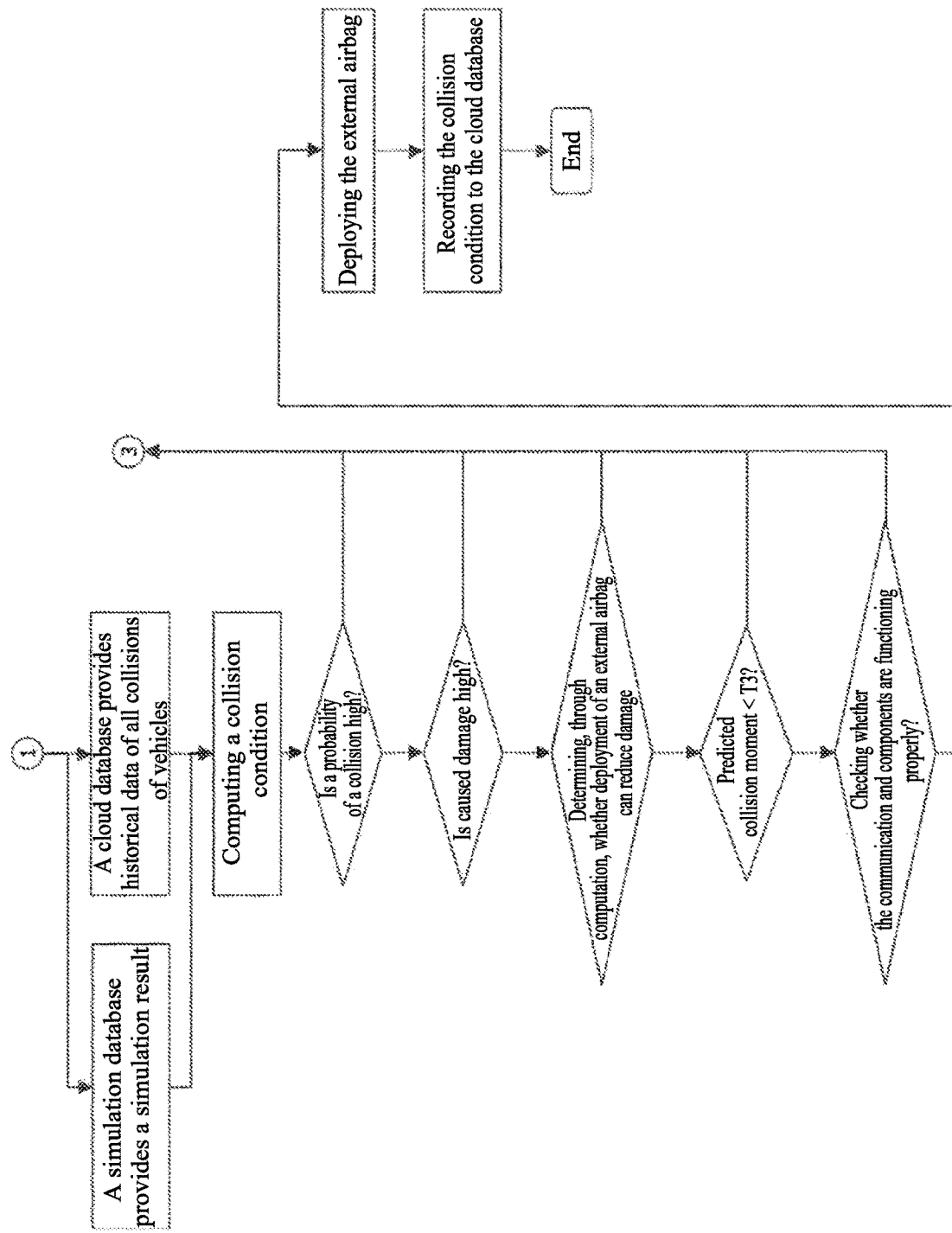

An exemplary arrangement of a safety system of the present application is understood with reference to FIG. 1 and FIGS. 3A and 3B. A safety system 10 for improving road compatibility of a vehicle includes a monitoring system 1 and an integrated safety domain control unit 2. The safety system 10 can control receiving or deployment of an external airbag 20 of the vehicle, that is, the safety system 10 and the external airbag 20 may constitute a vehicle safety apparatus 100. Those skilled in the art can understand that the safety system 10 and the external airbag 20 may be co-located in the vehicle, or may be separate, for example, the safety system 10 is located outside the vehicle, and controls the external airbag 20 to be deployed or be received through wireless communication. A specific form of the external airbag 20 may include a front airbag arranged in the front of the vehicle body, that is, a vehicle head part, and may further include a rear airbag arranged at the rear of the vehicle body, to improve road compatibility in the event of a high-speed rear-end collision, and even may further include side airbags located on both sides of the vehicle body. The front airbag, the rear airbag, and the side airbags together constitute an entire external airbag that surrounds the vehicle body, so as to improve road compatibility in collisions in all directions.

The monitoring system 1 may include a vehicle external information monitoring module 11 and a vehicle body posture monitoring module 12. The vehicle external information monitoring module 11 is configured to monitor an obstacle around the vehicle body, and the obstacle here refers to a generalized obstacle, that is, a collision object that may be collided with on a road. The vehicle body posture monitoring module 12 is configured to monitor vehicle body motion and a vehicle body posture. The integrated safety domain control unit 2 is configured to process data acquired from the monitoring system 1 and output a control signal to the external airbag 20.

The integrated safety domain control unit 2 is configured to compute a collision condition between the vehicle and an obstacle based on data acquired by the vehicle external information monitoring module 11 and the vehicle body posture monitoring module 12. The collision condition includes at least a collision relative speed and a collision overlap rate, and may further include a collision probability, a collision moment, and a collision position. It is determined, based on the collision relative speed and the collision overlap rate, whether to deploy the external airbag 20. A determination condition for controlling triggering of deployment of the external airbag 20 includes determining whether the collision relative speed is greater than a first speed threshold V1 and whether the collision overlap rate is greater than a first overlap rate threshold X1. Specifically, in a specific collision condition, if the integrated safety domain control unit 2 determines, through computation, that the collision relative speed is less than the first speed threshold V1, and/or the collision overlap rate is less than the first overlap threshold X1, a control signal for keeping a received state is output to the external airbag 20, to keep the external airbag received. However, if the collision relative speed is greater than the first speed threshold V1 and the collision overlap rate is greater than the first overlap threshold X1, it can be determined that road compatibility can be improved by deploying the external airbag 20 in the collision condition.

The beneficial effects of using the safety system 10 and the vehicle safety apparatus 100 of the above exemplary arrangements is that, the integrated safety domain control unit 2 uses the collision relative speed and the collision overlap rate as determination conditions to determine whether to deploy the external airbag, where the external airbag does not need to be deployed if the collision relative speed is less than the first speed threshold V1 and/or the collision overlap rate is less than the first overlap rate threshold X1. In this way, the external airbag can be configured to improve road compatibility in a more targeted manner to avoid danger caused by false triggering of the external airbag 20. There is also no need to perform determination and computation on whether to deploy the external airbag 20 in a medium-low speed collision, thus improving the computation speed of the integrated safety domain control unit 2 and improving road compatibility.

Still referring to FIG. 1 and FIGS. 3A and 3B, in some exemplary arrangements, the conditions for controlling triggering of the deployment of the external airbag 20 by the integrated safety domain control unit 2 may further include determining whether the deployment of the external airbag 20 reduces damage to the vehicle in the collision condition; and if the deployment of the external airbag in the collision condition does not reduce damage to the vehicle, the integrated safety domain control unit 2 controls the external airbag 20 to keep received. Specifically, for example, the collision position is not a protection area covered by the external airbag 20; for another example, the vehicle external information monitoring module 11 monitors and recognises that a mass of an obstacle that has be collided with is much greater than that of the vehicle on this side, such as a large truck, a bus, etc. In this case, even if the external airbag 20 is deployed in the vehicle on this side, the damage cannot be reduced, and the integrated safety domain control unit 2 controls the external airbag 20 to keep received.

The monitoring system 1 may further include an in-vehicle monitoring module 13 configured to acquire mental state data of a driver in the vehicle, for example including one or a combination of health state data and facial data of the driver in the vehicle. The above data can be acquired by hardware of a camera and/or an in-vehicle radar. Specifically, the health state data monitored by the camera may include heartbeat information, etc., and information about the facial data may include facial emotional state information (such as excitement and rage), facial fatigue state information (such as blinking frequency and yawn), facial gaze information (such as that a camera tracks the gaze of a person to determine whether a driver has noticed the obstacle), and facial orientation information (such as that the head turning of the occupant is determined, based on a facial orientation, for analysis, to determine whether the person pays attention to the front). The in-vehicle radar can function to implement in-vehicle live detection and heartbeat detection.

The integrated safety domain control unit 2 can compute, in combination with the mental state data of the driver in the vehicle and the data acquired by the vehicle external information monitoring module 11 and the vehicle body posture monitoring module 12, a possibility that the driver in the vehicle notices a collision with the obstacle, and compute the collision condition based on the possibility. For example, the possibility, obtained through computation by the integrated safety domain control unit 2, that the driver in the vehicle notices a collision with the obstacle is low, and then the collision relative speed in the computation result in the collision condition is increased, the collision moment is advanced, and the collision probability is increased. It can be learned that, by providing the in-vehicle monitoring module 13, the integrated safety domain control unit 2 can fuse mental state information of the driver, vehicle external information, and vehicle body posture to compute the collision condition, so that a computation result is more accurate and results of road conditions and own vehicle conditions that are closest to the actual situation are obtained. However, those skilled in the art can understand that the possibility that the driver in the vehicle notices a collision with the obstacle can also be obtained in another manner. For example, the integrated safety domain control unit 2 performs matching between the vehicle body posture and big data of the mental state of the driver, and obtains data of the above possibility directly by using data acquired by the vehicle body posture monitoring module 12, thus reducing a computation amount. Hardware and software costs thereof are low, but computation accuracy thereof is lower than those in providing the in-vehicle monitoring module 13.

Still referring to FIG. 1, in an exemplary arrangement, the integrated safety domain control unit 2 may include an alarm prompt function. If the possibility that the driver in the vehicle notices a collision with the obstacle is less than an alarm threshold, the integrated safety domain control unit 2 outputs an alarm signal to make a sharp warning sound in the vehicle, or light a dashboard or the centre console screen up, or make vibration at a steering wheel, or prompt the driver in another manner, so as to increase the possibility that the driver notices a collision with the obstacle. Specific monitoring and determination steps may be as follows: Heartbeat data of the driver that is acquired by the in-vehicle monitoring module 13 is a first value, blinking frequency of the driver is a second value, and it is determined, based on database information, that the driver is in a first mental state at this time, and the possibility that a collision is noticed is greater than the alarm threshold. Therefore, no prompt is given. Heartbeat data of the driver that is acquired by the in-vehicle monitoring module 13 is a third value, blinking frequency of the driver is a fourth value, and a facial gaze is away from a road surface for more than a first time. It is determined, based on database information, that the driver is in a second mental state at this time, and the possibility that the driver notices a collision with the obstacle is less than the alarm threshold, and then an alarm is given to prompt the driver. In this way, collision accidents can be avoided as much as possible, and even if the collision cannot be completely avoided, the driver can react in time to reduce the collision relative speed, thereby avoiding a high-speed collision. The integrated safety domain control unit 2 repeats the above possibility computation process until the possibility is greater than the alarm threshold, then cancels the output of the alarm signal, and the integrated safety domain control unit 2 computes a changed collision condition in real time based on the changed value of the possibility after the alarm.

Still referring to FIG. 1, in some exemplary arrangements, the monitoring system 1 may further include an Internet of Vehicles module 14. Communication between the Internet of Vehicles and another travelling vehicle and/or an obstacle and/or a network system can provide information between the vehicle and the obstacle. The Internet of Vehicles module 14 together with the vehicle external information monitoring module 11 provides information about the obstacle around the vehicle, to further improve the computation accuracy of the integrated safety domain control unit 2.

In one or more exemplary arrangements, the vehicle external information monitoring module 11 includes one or a combination of a millimeter wave radar, a laser radar, and an external camera. The millimeter wave radar and the laser radar are configured to locate an obstacle and acquire data, such as a speed, an angle, and a distance, of the obstacle. The millimeter wave radar is not susceptible to interference from weather and has a long detection range, and can monitor the obstacle in a long range. The laser radar is higher in terms of precision and simple in terms of data processing, and can complement the information acquired by the millimeter wave radar in terms of data content and precision, so that a monitoring result is more accurate. The external camera is configured to acquire image information of the obstacle, for use in distinguishing and identification of the obstacle.

The vehicle body posture monitoring module 12 includes a speed sensor, a yaw velocity sensor, and a steering wheel angle sensor, where the speed sensor is configured to monitor the vehicle body motion, and the yaw velocity sensor and the steering wheel angle sensor are configured to monitor the vehicle body posture. It can be understood that sensors included in the vehicle body posture monitoring module 12 are not limited to those described above, and may alternatively be other sensors carried in the vehicle body.

The integrated safety domain control unit 2 may obtain, through computation, a monitoring area based on data acquired by the vehicle body posture monitoring module 12, that is, obtaining an area that is corresponding to a vehicle body posture and vehicle body motion and in which a collision with an obstacle may occur, while the vehicle external information monitoring module 11 monitors only an obstacle in the monitoring area, such that a data acquisition amount and a data processing amount of the vehicle external information monitoring module 11 can be reduced, and a data processing amount of the integrated safety domain control unit 2 can also be reduced. In this way, an operation speed of the safety system 10 is faster, and the software and hardware requirements are reduced, resulting in lower costs.

Still referring to FIG. 1, in some exemplary arrangements, the integrated safety domain control unit 2 may have a modelling function and perform computation based on the modelling information. The integrated safety domain control unit 2 separately models the obstacle and the vehicle. Specifically, the integrated safety domain control unit 2 fuses data acquired by the millimeter wave radar, the laser radar, and the external camera, and continuously models the obstacle in real time. In addition, the integrated safety domain control unit 2 continuously models the traveling vehicle in real time based on vehicle body motion information monitored by the speed sensor, vehicle body yaw angular velocity information monitored by the yaw velocity sensor, and vehicle steering wheel angle information monitored by the steering wheel angle sensor. The integrated safety domain control unit 2 compares obstacle modelling information and vehicle body modelling information, which are updated in real time, to compute the collision condition. In the meantime, the integrated safety domain control unit 2 updates computation results in real time during computation, and continuously compares the computation results with real-time observation results, to improve the computation accuracy with reduced errors.

Still referring to FIG. 1, in some exemplary arrangements, the safety system 10 further includes a cloud database 3 and a simulation database 4, where the cloud database 3 is configured to provide historical data of a collision between an obstacle and the vehicle, and the simulation database 4 is configured to provide simulation data of a collision between an obstacle and the vehicle based on the modelling information. The integrated safety domain control unit 2 computes the collision condition between the obstacle and the vehicle during the collision based on the historical data and the simulation data. Specifically, a distance by which the vehicle has traveled in a certain period of time is S=VT, and a speed thereof is V=V$_0$+aT. If deceleration cannot bring the speed down to 0 within a corresponding time and distance, the collision probability can be considered high. In addition, it also takes time to turn the vehicle at a certain angle. If it is unable to sufficiently turn the vehicle at an angle within the corresponding time and distance, the collision cannot be avoided. The collision position of the obstacle when a collision occurs can be computed by computing an angle at which the vehicle can be turned in a limited time.

An example of computing the collision probability may be as follows. The cloud database 3 provides historical data of a collision between an obstacle and a vehicle as a first collision model, and the simulation database 4 is configured to provide simulation data of a collision between an obstacle and a vehicle based on the modelling information as a second collision model. The integrated safety domain control unit 2 fuses data information of the first collision model and the second collision model to compute the collision condition between the obstacle and the vehicle.

It will be appreciated that the integrated safety domain control unit 2 as in the previous implementation may include one or a combination of one or more hardware processors, such as a system on chip (SOC), a microcontroller, a microprocessor (e.g., an MCU chip or a 51 single-chip microcomputer), a reduced instruction set computer (RISC), an application specific integrated circuit (ASIC), an application specific instruction integrated processor (ASIP), a central processing unit (CPU), a graphics processing unit (GPU), a physical processing unit (PPU), a microcontroller unit, a digital signal processor (DSP), a field programmable gate array (FPGA), an advanced RISC machine (ARM), a programmable logic device (PLD), any circuit or processor capable of performing one or more functions, etc.

Figure 2:
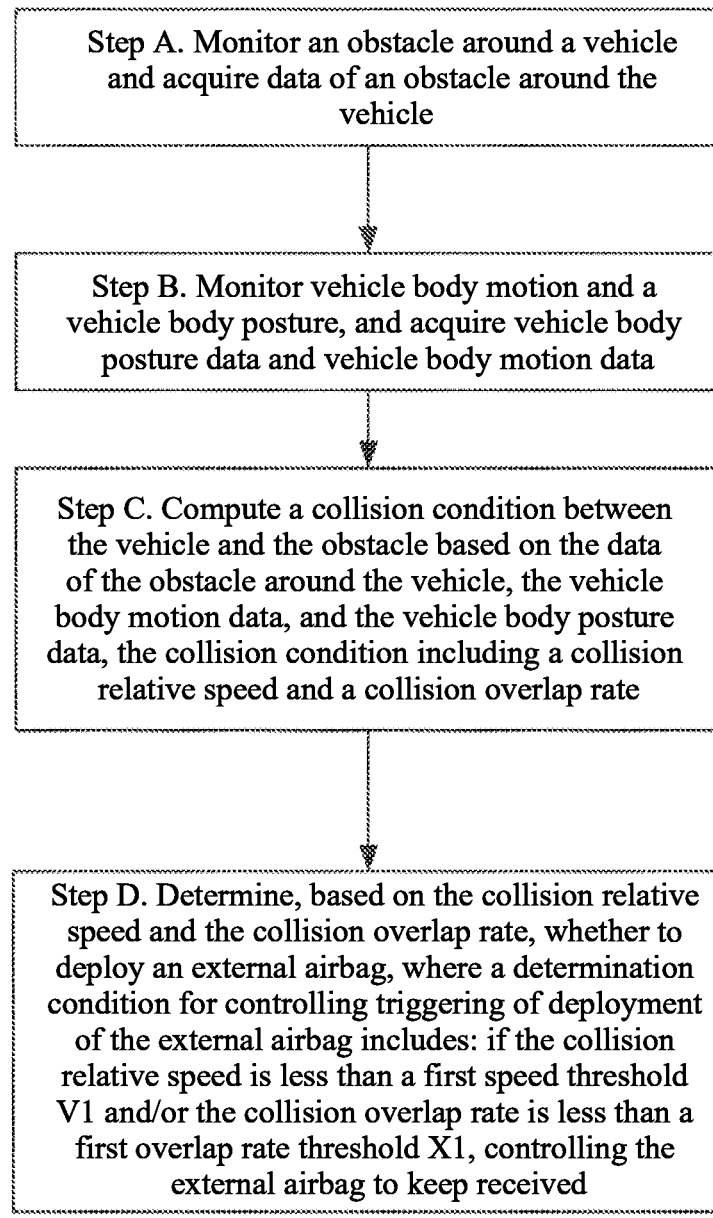
FIG. 2 is a flowchart of a method for improving road compatibility of a vehicle according to an exemplary arrangement.

Referring to FIG. 2 and FIGS. 3A and 3B, it can be learned from the above description that, for a vehicle including an external airbag, the method for improving road compatibility of the vehicle may include the following steps:

step A. monitoring an obstacle around the vehicle and acquiring data of the obstacle around the vehicle;

step B. monitoring vehicle body motion and a vehicle body posture, and acquiring vehicle body posture data and vehicle body motion data, where specifically, as shown in FIG. 3A, in one or more exemplary arrangements, a vehicle sensor acquires and monitors vehicle body data, including vehicle body motion data and vehicle body posture data, and the monitoring area is obtained through computation, that is, an area that is corresponding to a vehicle body posture and vehicle body motion and in which a collision may occur is obtained, while the radar and the camera monitor the information about the obstacle around the vehicle, and the Internet of Vehicles can also provide information about the obstacle around the vehicle;

step C. computing a collision condition between the vehicle and the obstacle based on the data of the obstacle around the vehicle, the vehicle body motion data, and the vehicle body posture data, the collision condition including a collision relative speed and a collision overlap rate; and step D. determining, based on the collision relative speed and the collision overlap rate, whether to deploy the external airbag, where a determination condition for controlling triggering of deployment of the external airbag includes: if the collision relative speed is less than a first speed threshold V1 and/or the collision overlap rate is less than a first overlap rate threshold X1, controlling the external airbag to keep received, instead of triggering the external airbag to be deployed.

Specifically, as shown in FIG. 3A, in some exemplary arrangements, it is determined, based on the monitored obstacle around the vehicle, vehicle body motion, and vehicle body motion posture, whether there are obstacles in the monitoring area, and it is recognised that a type of an obstacle is a static obstacle or a dynamic obstacle, such as a travelling vehicle, and the static obstacle may be a roadblock, a stopped vehicle, etc. Then, the obstacle is modelled, motion of the obstacle is predicted, including a motion direction and speed, and a collision condition of each obstacle is computed. The collision condition includes at least a collision relative speed and a collision overlap rate, and may further include a collision probability, a collision moment, and a collision position. The probability of a collision with each obstacle is computed, and the obstacle with the highest collision probability is selected for the determination of deploying the external airbag to improve the road compatibility of the vehicle. First, it may be determined whether the collision relative speed is less than the first speed threshold V1 and whether the collision overlap rate is less than X1. If any one of the two is met, the external airbag is controlled to keep received, so that it can be quickly and accurately determined whether the external airbag needs to be deployed, which allow the external airbag to be deployed in time, thereby improving the road compatibility of the vehicle. Then, it is determined whether a predicted collision moment is before a first moment T1.

As shown in FIG. 3A, In some exemplary arrangements, a mental state of a driver in the vehicle may be further monitored, and mental state data of the driver in the vehicle is acquired; and a possibility that the driver notices a collision with the obstacle is computed based on the state data, the data of the obstacle around the vehicle, the vehicle body motion data, and the vehicle body posture data, and the collision condition is computed based on the possibility. If the possibility is less than the alarm threshold, the driver is warned to increase the possibility that the driver notices a collision, a collision time is corrected based on the above computation result of the possibility, and it is determined whether the predicted collision moment is before a second moment T2. If the predicted collision moment is not before the second moment T2, a collision may be avoided, or even if a collision occurs, there is no need to trigger the deployment of the external airbag.

As shown in FIG. 3B, in one or more exemplary arrangements, the historical data of the collision between the vehicle and the obstacle can also be obtained from the cloud database, and a simulation result of the collision between the vehicle and the obstacle can be obtained from the simulation database, to provide comparison and reference for the computation of the integrated safety domain control unit 2, so that the computation of the collision condition is more accurate.

As shown in FIG. 3B, the method for improving road compatibility of the vehicle may further include determining, through computation, whether deployment of the external airbag in the collision condition reduces damage to the vehicle; and if the deployment of the external airbag in the collision condition does not reduce the damage to the vehicle, controlling the external airbag to keep received, instead of triggering the external airbag to be deployed. For example, it is recognised, based on the data of the obstacle around the vehicle, that a mass of an obstacle that has be collided with is much greater than that of the vehicle on this side, such as a large truck, a bus, etc. In this case, even if the external airbag is deployed in the vehicle on this side, the damage cannot be reduced, and the external airbag is controlled to keep received, instead of being triggered to be deployed.

Still referring to FIG. 3B, if it is determined that the deployment of the external airbag can reduce the damage, it may then be determined whether the predicted collision moment is before a third moment T3. If the predicted collision moment is before the third moment T3, it may be checked whether the communication and components are functioning properly, and if the communication and components are functioning properly, the external airbag is deployed.

Still referring to FIG. 3B, after the collision, the collision condition can also be recorded to the cloud database, including parameters such as a collision probability, a collision moment, a collision position, a collision relative speed, and a collision overlap rate. Those skilled in the art can understand that although some embodiments shown in FIG. 3B show that the external airbag is deployed and then recording is performed, it is not limited to this. For example, even if the external airbag is not deployed because it is determined that the deployment of the external airbag cannot reduce the damage, the data of this collision can still be recorded in the cloud database, so that the samples of the database can be increased, and the accuracy of the prediction can be continuously enhanced due to the learning capability of the database itself.

Although the above method is illustrated and described as a series of actions for simplicity of explanation, it should be understood and appreciated that the steps are not limited by the order of the actions. The reason is that, according to one or more exemplary arrangements, some actions may occur in a different order and/or concurrently with other actions illustrated and described herein or not illustrated and described herein but understandable to those skilled in the art, for example, step A and step B described above may be performed simultaneously.

According to another aspect of the present application, the present application further provides a computer-readable storage medium.

The above computer-readable storage medium provided in the present application has computer instructions stored thereon. When the computer instructions are executed by a processor, the program may be executed by the processor to implement the following steps:

computing a collision condition between a vehicle and an obstacle based on data of the obstacle around the vehicle, vehicle body motion data, and vehicle body posture data that are input, the collision condition including a collision probability, a collision moment, a collision position, a collision relative speed, and a collision overlap rate; and determining, based on the collision relative speed and the collision overlap rate, whether to trigger deployment of an external airbag 20, where a determination condition therefor includes: if the collision relative speed is less than a first speed threshold V1 and/or the collision overlap rate is less than a first overlap rate threshold X1, controlling the external airbag 20 to keep received, instead of triggering the external airbag 20 to be deployed.

It will be appreciated by those skilled in the art that additional steps may be further executed by the program, such as the steps that may be executed by the program as described above in the method for improving road compatibility of a vehicle.

Exemplary arrangements of a vehicle safety system and apparatus, a method for enhancing safety of a vehicle, and a medium are described below.

It should be explained that a vulnerable road user (VRU) described in the following exemplary arrangements includes a pedestrian and a two-wheeled vehicle such as a bicycle, a motorcycle, and an electric bicycle. The two-wheeled vehicle does not refer to a transportation arrangement itself but a user that uses the transportation arrangement.

Figure 4:
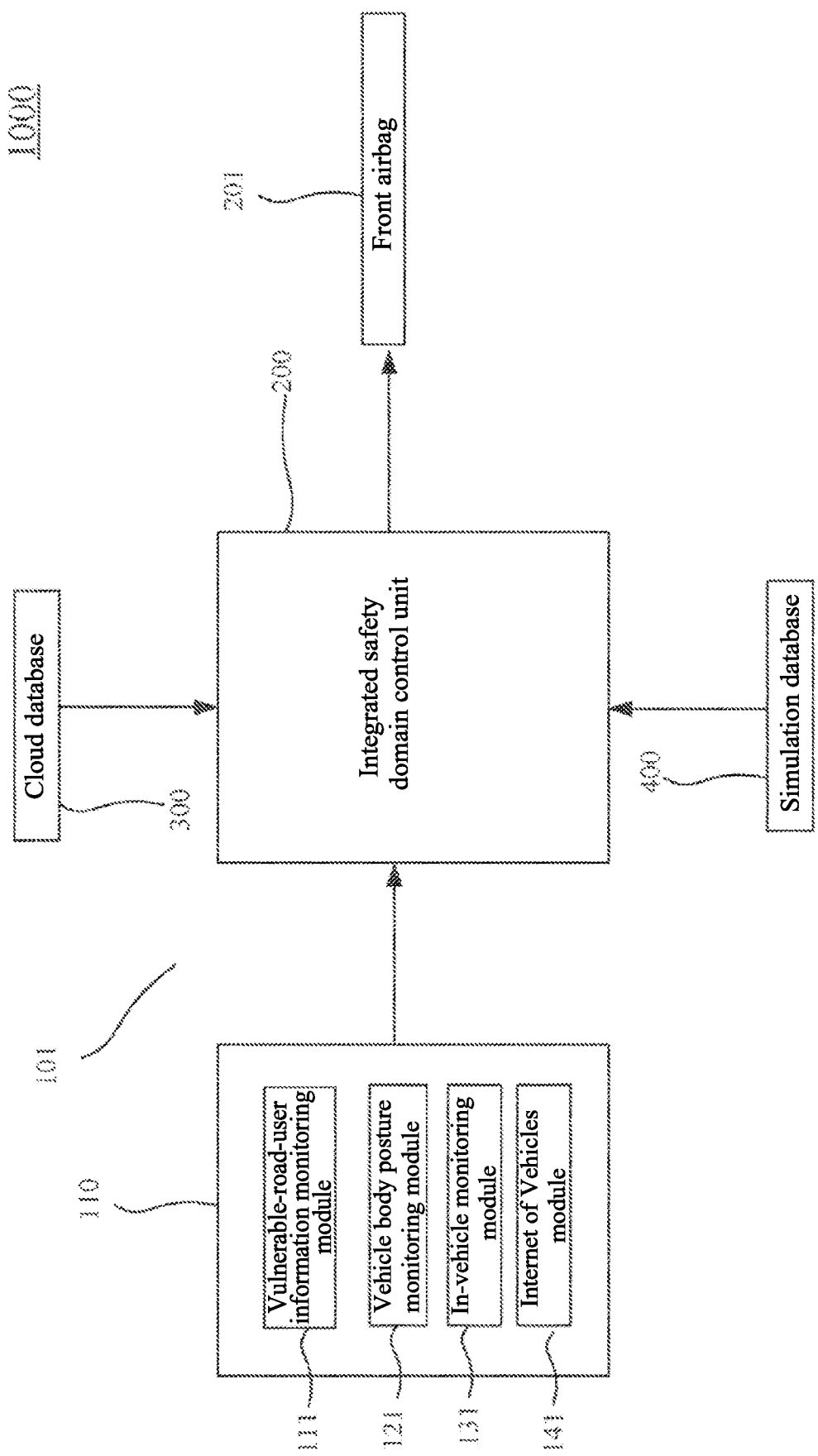
FIG. 4 is a schematic diagram of a vehicle safety system according to one or more exemplary arrangements.

Referring to FIG. 4 to understand an exemplary arrangement of the vehicle safety system in the present application. A vehicle safety system 101 for reducing collision damage between a vulnerable road user and the front of a vehicle body includes a monitoring system 110 and an integrated safety domain control unit 200. The vehicle safety system 101 can control receiving or deployment of a front airbag 201 of a vehicle, that is, the vehicle safety system 101 and the front airbag 201 may constitute a vehicle safety apparatus 1000. Those skilled in the art can understand that the vehicle safety system 101 and the front airbag 201 may be co-located in the vehicle, or may be separate, for example, the vehicle safety system 101 is located outside the vehicle, and controls the front airbag 201 to be deployed or be received through wireless communication. The monitoring system 110 may include a vulnerable-road-user information monitoring module 111 and a vehicle body posture monitoring module 121. The vulnerable-road-user information monitoring module 111 is configured to monitor the vulnerable road user around the vehicle, and the vehicle body posture monitoring module 121 is configured to monitor vehicle body motion and a posture of the front of the vehicle body. The integrated safety domain control unit 200 is configured to process data acquired from the monitoring system 110 and output a control signal to the front airbag 201.

The integrated safety domain control unit 200 is configured to compute a collision condition between the vehicle and the vulnerable road user based on data acquired by the vulnerable-road-user information monitoring module 111 and the vehicle body posture monitoring module 121, the collision condition including a collision probability, a collision moment, a relative speed at the time of the collision, and a collision position between the head of the vulnerable road user and the front of the vehicle body at the time of the collision; and compute the damage value to the vulnerable road user based on the collision condition, and output a signal for controlling the front airbag 201 to trigger the deployment or a signal for controlling the front airbag 201 to keep received. Specifically, the integrated safety domain control unit 200 computes a first damage value H1 to the vulnerable road user when the front airbag 201 is received in the collision condition and a second damage value H2 to the vulnerable road user when the front airbag 201 is deployed in the collision condition, compares H1 and H2, if H1 is greater than H2, outputs a control signal for triggering deployment to the front airbag 201 to trigger the front airbag to be deployed, and if H1 is less than H2, outputs a control signal for keeping received to the front airbag 201 to keep the front airbag received.

The beneficial effects of using the vehicle safety system 101 and the vehicle safety apparatus 1000 of the above exemplary arrangements is that, the integrated safety domain control unit 200 computes and compares the damage values, so that the vulnerable road user is protected to the greatest extent when the vulnerable road user collides with the front of the vehicle body of the vehicle. It avoids the problem in the prior art that the deployment of the front airbag may cause more damage to vulnerable road users. For example, it can be avoided that an impact force during the instantaneous deployment of the front airbag 201 becomes the main cause of damage of the collision accident when a pedestrian collides at a very low speed. Similarly, in other false triggering systems that simply use a speed as a determination factor, for a vulnerable road user with a low collision speed and a high height, such as a road bicycle, the front airbag 201 fails to be deployed in time, causing the head of the vulnerable road user to collide with a high envelope value area, such as the windshield, in the front of the vehicle body after the collision and then be badly hurt.

Specifically, in one or more exemplary arrangements, H1 may include a third damage value H3 caused by a first collision position between the head of the vulnerable road user and the front of the vehicle body when the front airbag 201 is in a received state at the time of the collision, and H2 may include a sum of a fourth damage value H4 caused by a second collision position between the head of the vulnerable road user and the front of the vehicle body when the front airbag 201 is in a deployed state at the moment of the collision and a fifth damage value H5 caused by impact energy to the vulnerable road user at the time of the front airbag 201 being triggered to be deployed minus a damage reduction value H6 to the vulnerable road user caused by impact energy being absorbed due to the deployment of the front airbag 201, that is, the integrated safety domain control unit 200 compares H3 with H4+H5−H6. H4 is generally less than H3 because deployment of the front airbag 201 generally causes an envelope value for the second collision position to be lower than that for the first collision position. However, in some low-speed collision situations, a deployment impact force of the front airbag 201 may cause the pedestrian's legs, including the thigh and calf, to be injured due to an impact force of the airbag, or secondary damage is caused to the pedestrian due to the impact to the end. Therefore, damage values to the vulnerable road user when the front airbag 201 is in the deployed state and the received state in the collision condition can be accurately compared by comparing H3 and H4+H5−H6.

Still referring to FIG. 4, in one or more exemplary arrangements, the monitoring system 110 may further include an in-vehicle monitoring module 131 configured to acquire mental state data of a driver in the vehicle, for example including one or a combination of health state data and facial data of the driver in the vehicle. The above data can be acquired by hardware of a camera and/or an in-vehicle radar. Specifically, the health state data monitored by the camera may include heartbeat information, etc., and information about the facial data may include facial emotional state information (such as excitement and rage), facial fatigue state information (such as blinking frequency and yawn), facial gaze information (such as that a camera tracks the gaze of a person to determine whether a driver has noticed the vulnerable road user), and facial orientation information (such as that the head turning of the occupant is determined, based on a facial orientation, for analysis, to determine whether the person pays attention to the front). The in-vehicle radar can function to implement in-vehicle live detection and heartbeat detection.

The integrated safety domain control unit 200 can compute, in combination with the mental state data of the driver in the vehicle and the data acquired by the vulnerable-road-user information monitoring module 111 and the vehicle body posture monitoring module 121, a possibility that the driver in the vehicle notices a collision with the vulnerable road user, and compute the collision condition based on the possibility. For example, the possibility, obtained through computation by the integrated safety domain control unit 200, that the driver in the vehicle notices a collision with the vulnerable road user is low, and then the collision relative speed in the computation result in the collision condition is increased, the collision moment is advanced, and the probability of the collision is increased. It can be learned that the in-vehicle monitoring module 131 may be provided such that a computation result of the integrated safety domain control unit 200 is more accurate. However, those skilled in the art can understand that the possibility that the driver in the vehicle notices a collision with the vulnerable road user can also be obtained in another manner. For example, the integrated safety domain control unit 200 performs matching between the vehicle body posture and big data of the state of the driver, and obtains data of the above possibility directly by using data acquired by the vehicle body posture monitoring module 121, thus reducing a computation amount. Hardware and software costs thereof are low, but computation accuracy thereof is lower than those in providing the in-vehicle monitoring module 131.

Still referring to FIG. 4, in an exemplary arrangement, the integrated safety domain control unit 200 may include an alarm prompt function. If the possibility that the driver in the vehicle notices a collision with the vulnerable road user is less than an alarm threshold, the integrated safety domain control unit 200 outputs an alarm signal to make a sharp warning sound in the vehicle, or light a dashboard or the centre console screen up, or make vibration at a steering wheel, or prompt the driver in another manner, so as to increase the possibility that the driver notices a collision with the vulnerable road user. Specific monitoring and determination steps may be as follows: Heartbeat data of the driver that is acquired by the in-vehicle monitoring module 131 is a first value, blinking frequency of the driver is a second value, and it is determined, based on database information, that the driver is in a first mental state at this time, and the possibility that a collision is noticed is greater than the alarm threshold. Therefore, no prompt is given. Heartbeat data of the driver that is acquired by the in-vehicle monitoring module 131 is a third value, blinking frequency of the driver is a fourth value, and a facial gaze is away from a road surface for more than a first time. It is determined, based on database information, that the driver is in a second mental state at this time, and the possibility that the driver notices a collision with the vulnerable road user is less than the alarm threshold, and then an alarm is given to prompt the driver. The integrated safety domain control unit 200 repeats the above possibility computation process until the possibility is greater than the alarm threshold, then cancels the output of the alarm signal, and the integrated safety domain control unit 200 computes a changed collision condition in real time based on the changed value of the possibility after the alarm.

Still referring to FIG. 4, in some exemplary arrangements, the monitoring system 110 may further include an Internet of Vehicles module 141. Communication between the Internet of Vehicles and another travelling vehicle and/or a vulnerable road user and/or a network system can provide information between the vehicle and the vulnerable road user. The Internet of Vehicles module 141 together with the vulnerable-road-user information monitoring module 111 provides information about the vulnerable road user around the vehicle, to further improve the computation accuracy of the integrated safety domain control unit 200.

In one or more exemplary arrangements, the vulnerable-road-user information monitoring module 111 includes one or a combination of a millimeter wave radar, a laser radar, and an external camera. The millimeter wave radar and the laser radar are configured to locate a vulnerable road user and acquire data, such as a speed, an angle, and a distance, of the vulnerable road user. The millimeter wave radar is not susceptible to interference from weather and has a long detection range, and can monitor the vulnerable road user in a long range. The laser radar is higher in terms of precision and simple in terms of data processing, and can complement the information acquired by the millimeter wave radar in terms of data content and precision, so that a monitoring result is more accurate. The external camera is configured to acquire image information of the vulnerable road user, for use in distinguishing and identification of the vulnerable road user.

The vehicle body posture monitoring module 121 includes a speed sensor, a yaw velocity sensor, and a steering wheel angle sensor, where the speed sensor is configured to monitor the vehicle body motion, and the yaw velocity sensor and the steering wheel angle sensor are configured to monitor the vehicle body posture. It can be understood that sensors included in the vehicle body posture monitoring module 121 are not limited to those described above, and may alternatively be other sensors carried in the vehicle body.

The integrated safety domain control unit 200 may obtain, through computation, a monitoring area based on data acquired by the vehicle body posture monitoring module 121, that is, obtaining an area that is corresponding to a vehicle body posture and vehicle body motion and in which a collision with a vulnerable road user may occur, while the vulnerable-road-user information monitoring module 111 monitors only a vulnerable road user in the monitoring area, such that a data acquisition amount and a data processing amount of the vulnerable-road-user information monitoring module 111 can be reduced, and a data processing amount of the integrated safety domain control unit 200 can also be reduced. In this way, an operation speed of the vehicle safety system 101 is faster, and the software and hardware requirements are reduced, resulting in lower costs.

Still referring to FIG. 4, in some exemplary arrangements, the integrated safety domain control unit 200 may have a modelling function and perform computation based on the modelling information. The integrated safety domain control unit 200 separately models the vulnerable road user and the vehicle. Specifically, the integrated safety domain control unit 200 fuses data acquired by the millimeter wave radar, the laser radar, and the external camera, and continuously models the vulnerable road user in real time. In addition, the integrated safety domain control unit 200 continuously models the traveling vehicle in real time based on vehicle body motion information monitored by the speed sensor, vehicle body yaw angular velocity information monitored by the yaw velocity sensor, and vehicle steering wheel angle information monitored by the steering wheel angle sensor. The integrated safety domain control unit 200 compares vulnerable road user modelling information and vehicle body modelling information, which are updated in real time, to compute the collision condition. In the meantime, the integrated safety domain control unit 200 updates computation results in real time during computation, and continuously compares the computation results with real-time observation results, to improve the computation accuracy with reduced errors.

Still referring to FIG. 4, in some exemplary arrangements, the vehicle safety system 101 further includes a cloud database 300 and a simulation database 400. The cloud database 300 is configured to provide historical data of a collision between a vulnerable road user and the front of a vehicle body, and the simulation database is configured to provide simulation data of a collision between a vulnerable road user and the front of a vehicle body based on the modelling information. The integrated safety domain control unit 200 computes the collision condition between the vulnerable road user and the front of the vehicle body during the collision based on the historical data and the simulation data. Specifically, a distance by which the vehicle has traveled in a certain period of time is S=VT, and a speed thereof is V=aT. If deceleration cannot bring the speed down to 0 within a corresponding time and distance, the collision probability can be considered high. In addition, it also takes time to turn the vehicle at a certain angle. If it is unable to sufficiently turn the vehicle at an angle within the corresponding time and distance, the collision cannot be avoided. The collision position between the head of the vulnerable road user and the front of the vehicle body when a collision occurs can be computed by computing an angle at which the vehicle can be turned in a limited time.

An example of computing the collision probability may be as follows. The cloud database 300 provides historical data of a collision between a vulnerable road user and the front of a vehicle body as a first collision model, and the simulation database 400 is configured to provide simulation data of a collision between a vulnerable road user and the front of a vehicle body based on the modelling information as a second collision model. The integrated safety domain control unit 200 fuses data information of the first collision model and the second collision model to compute the collision condition between the vulnerable road user and the front of the vehicle body.

It will be appreciated that the integrated safety domain control unit 200 as in the previous implementation may include one or a combination of one or more hardware processors, such as a system on chip (SOC), a microcontroller, a microprocessor (e.g., an MCU chip or a 51 single-chip microcomputer), a reduced instruction set computer (RISC), an application specific integrated circuit (ASIC), an application specific instruction integrated processor (ASIP), a central processing unit (CPU), a graphics processing unit (GPU), a physical processing unit (PPU), a microcontroller unit, a digital signal processor (DSP), a field programmable gate array (FPGA), an advanced RISC machine (ARM), a programmable logic device (PLD), any circuit or processor capable of performing one or more functions, etc.

Figure 5:
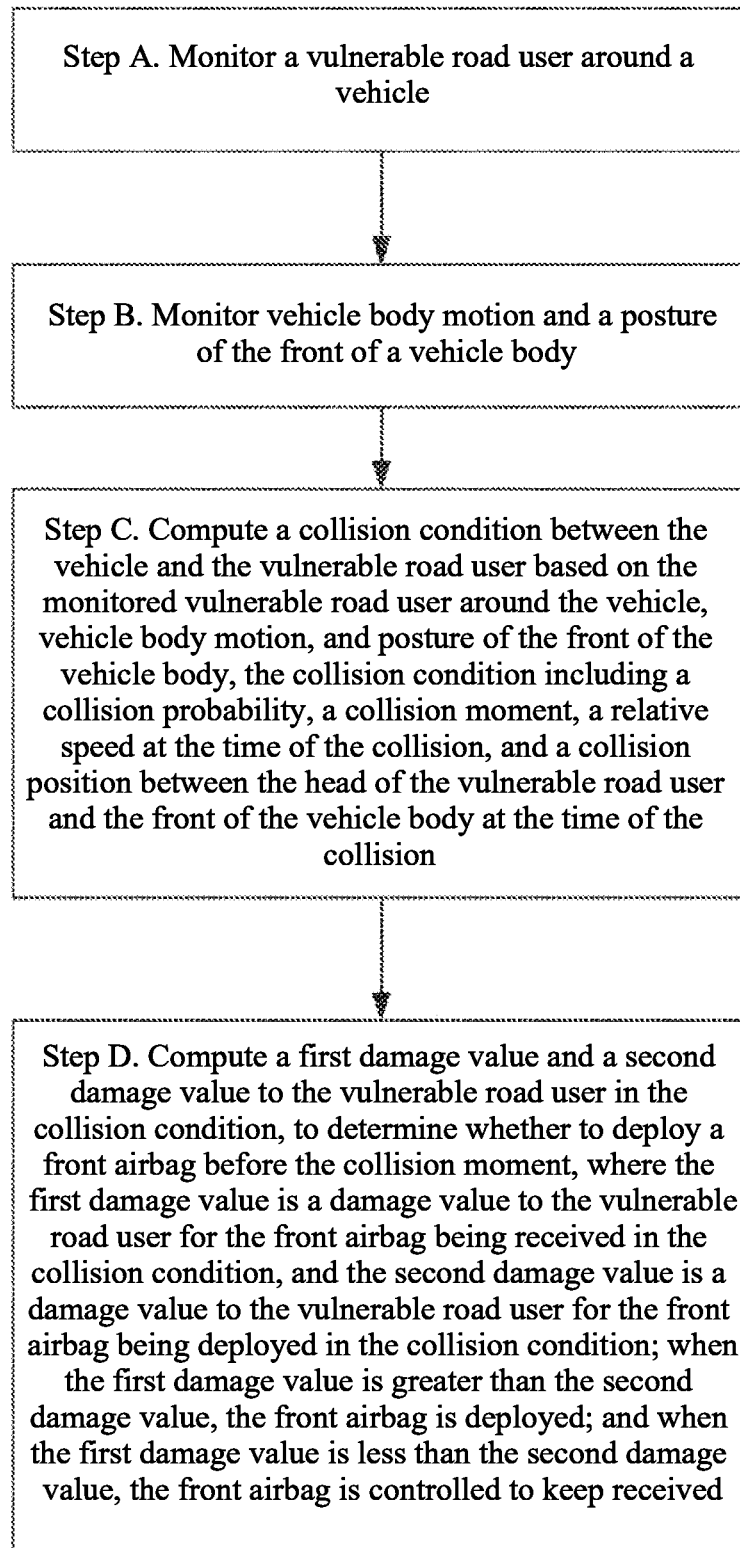
FIG. 5 is a flowchart of a method for enhancing safety of a vehicle according to an exemplary arrangement.
Figure 6A:
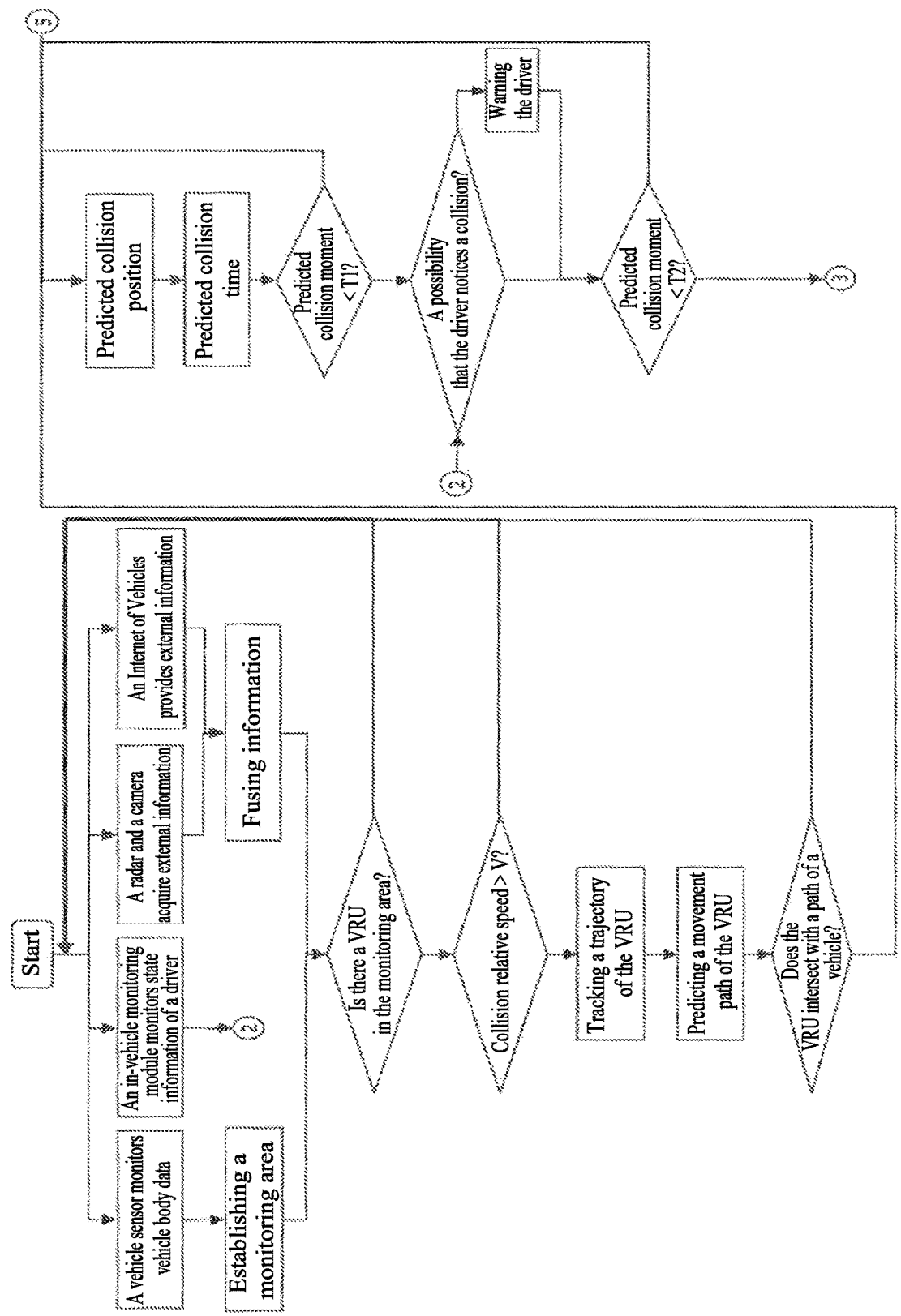
FIGS. 6A and 6B are a flowchart of a method for enhancing safety of a vehicle according to another exemplary arrangement.
Figure 6B:
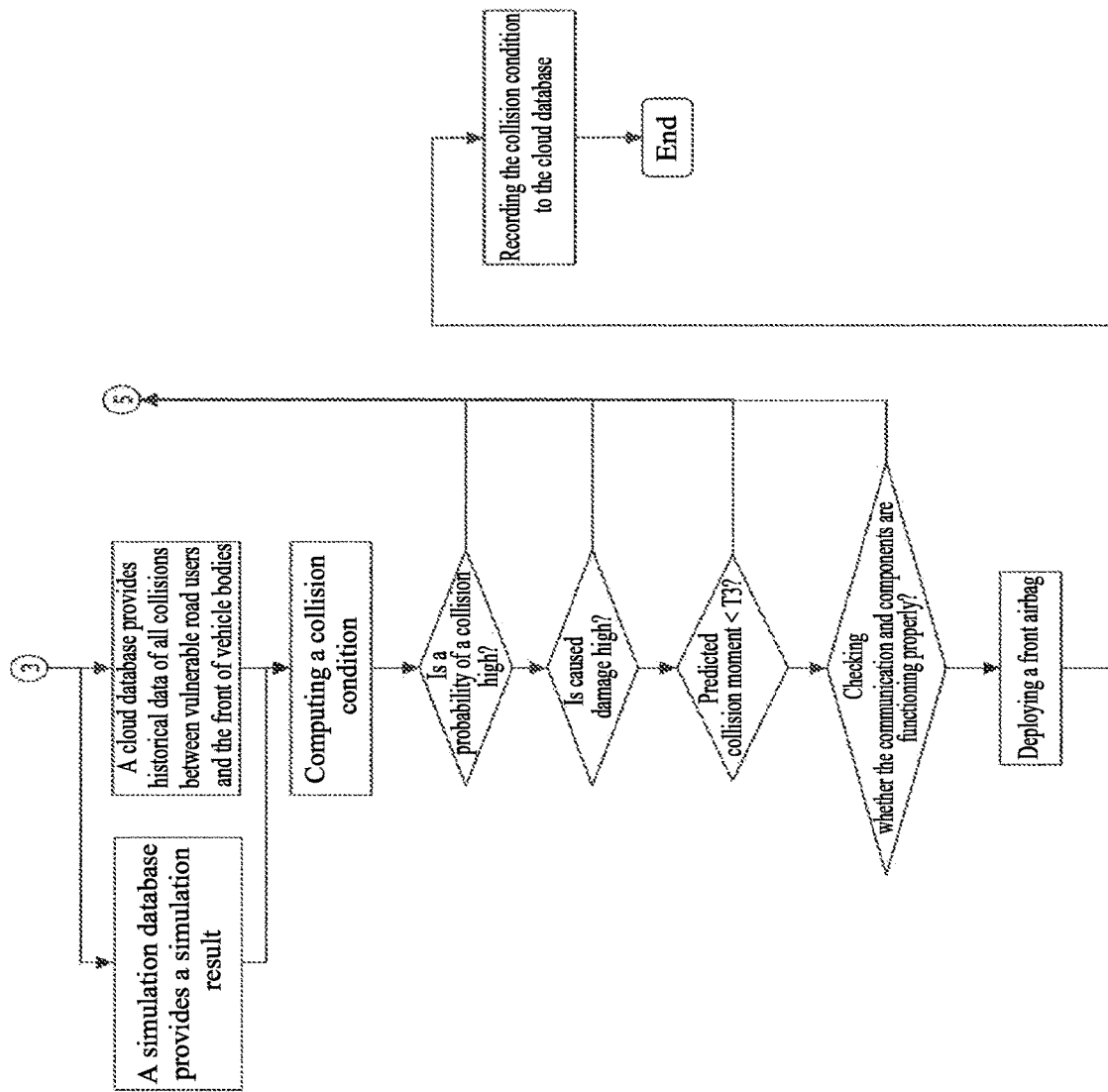

Referring to FIG. 5, it can be learned from the above description that, for a vehicle including a front airbag, the method for reducing collision damage between the vulnerable road user and the front of the vehicle body to enhance safety of the vehicle may include the following steps:

step A. monitoring the vulnerable road user around the vehicle;

step B. monitoring vehicle body motion and a posture of the front of the vehicle body, where specifically, as shown in FIG. 6A, in one or more exemplary arrangements, a vehicle sensor acquires and monitors vehicle body data, including vehicle body motion data and posture data of the front of the vehicle body, and the monitoring area is obtained through computation, that is, an area that is corresponding to a vehicle body posture and vehicle body motion and in which a collision with the vulnerable road user may occur is obtained, while the radar and the camera monitor the information about the vulnerable road user around the vehicle, and the Internet of Vehicles can also provide information about the vulnerable road user around the vehicle;

step C. computing a collision condition between the vehicle and the vulnerable road user based on the monitored vulnerable road user around the vehicle, vehicle body motion, and posture of the front of the vehicle body, the collision condition including a collision probability, a collision moment, a relative speed at the time of the collision, and a collision position between the head of the vulnerable road user and the front of the vehicle body at the time of the collision, where specifically, as shown in FIG. 6A, in some exemplary arrangements, it is determined, based on the monitored vulnerable road user around the vehicle, vehicle body motion, and posture of the front of the vehicle body, whether there are vulnerable road users in a monitoring area, it is determined whether the collision relative speed is greater than a first speed, if the collision relative speed is greater than the first speed, a trajectory of the vulnerable road user is tracked, a movement path of the vulnerable road user is predicted, it is determined whether the vulnerable road user intersects with a path of the vehicle, and if the vulnerable road user intersects with the path of the vehicle, the collision position and collision time between the vehicle and the vulnerable road user are predicted, to determine whether the predicted collision moment is before a first moment;

as shown in FIG. 6A, in some exemplary arrangements, state information of the driver can also be monitored through the in-vehicle monitoring module, and the possibility that the driver notices the collision with the vulnerable road user can be computed, if the possibility is less than the alarm threshold, the driver is warned to increase the possibility that the driver notices a collision, a collision time is corrected based on the above computation result of the possibility, and it is determined whether the predicted collision moment is before a second moment; and as shown in FIG. 6B, in one or more exemplary arrangements, historical data of a collision between a vulnerable road user and the front of a vehicle body can also be obtained from the cloud database, and a simulation result of the collision between the vulnerable road user and the front of the vehicle body can be obtained from the simulation database, to provide comparison and reference for the computation of the collision system, so that the computation of the collision condition is more accurate; and step D. computing a first damage value and a second damage value to the vulnerable road user in the collision condition, to determine whether to deploy the front airbag before the collision moment, where the first damage value is a damage value to the vulnerable road user for the front airbag being received in the collision condition, and the second damage value is a damage value to the vulnerable road user for the front airbag being deployed in the collision condition;

when the first damage value is greater than the second damage value, the front airbag is deployed; and when the first damage value is less than the second damage value, the front airbag is controlled to keep received.

Specifically, still referring to FIG. 6B, in some exemplary arrangements, after the collision condition is computed, it is then determined whether the collision probability between the vulnerable road user and the front of the vehicle body is greater than a threshold, and if the collision probability is greater than the threshold, the first damage value to the vulnerable road user for the front airbag being received in the collision condition is compared with the second damage value to the vulnerable road user for the front airbag being deployed in the collision condition. If the second damage value is greater than the first damage value, it is determined that the front airbag does not need to be deployed.

If the first damage value is greater than the second damage value, it may then be determined whether the predicted collision moment is before a third moment. If the predicted collision moment is before the third moment, it may be checked whether the communication and components are functioning properly, and if the communication and components are functioning properly, the front airbag is deployed.

Specifically, the first damage value includes a third damage value caused by a first collision position between the head of the vulnerable road user and the front of the vehicle body when the front airbag is in a received state at the time of the collision; and the second damage value includes a sum of a fourth damage value caused by a second collision position between the head of the vulnerable road user and the front of the vehicle body when the front airbag is in a deployed state at the moment of the collision and a fifth damage value caused by impact energy to the vulnerable road user at the time of the front airbag being triggered to be deployed minus a damage reduction value to the vulnerable road user caused by impact energy being absorbed due to the deployment of the front airbag.

Referring to FIG. 6B, step E may be further included. After the collision, the collision condition can also be recorded to the cloud database, including a collision probability, a collision moment, a relative speed at the time of the collision, a collision position between the head of the vulnerable road user and the front of the vehicle body at the time of the collision, and other data. Those skilled in the art can understand that although some embodiments shown in FIG. 6B show that the front airbag is deployed and then recording is performed, it is not limited to this. For example, if the front airbag is received during the collision because the first damage value is less than the second damage value, the collision condition of this collision can also be recorded to the cloud database.

Although the above method is illustrated and described as a series of actions for simplicity of explanation, it should be understood and appreciated that the steps are not limited by the order of the actions. The reason is that, according to one or more exemplary arrangements, some actions may occur in a different order and/or concurrently with other actions illustrated and described herein or not illustrated and described herein but understandable to those skilled in the art, for example, step A and step B described above may be performed simultaneously.

According to another aspect of the present application, the present application further provides a computer-readable storage medium.

The above computer-readable storage medium provided in the present disclosure has computer instructions stored thereon. When the computer instructions are executed by a processor, the program may be executed by the processor to implement the following steps:

computing a collision condition between a vehicle and a vulnerable road user based on data of the vulnerable road user around the vehicle, vehicle body motion data, and posture data of the front of a vehicle body that are input, the collision condition including a collision probability, a collision moment, a relative speed at the time of the collision, and a collision position between the head of the vulnerable road user and the front of the vehicle body at the time of the collision;

computing a first damage value and a second damage value to the vulnerable road user in the collision condition, where the first damage value is a damage value to the vulnerable road user caused by the front airbag being received in the collision condition, and the second damage value is a damage value to the vulnerable road user caused by the front airbag being deployed in the collision condition;

determining whether to deploy the front airbag before the collision moment, and when the first damage value is greater than the second damage value, controlling the front airbag to be deployed; and when the first damage value is less than the second damage value, controlling the front airbag to keep received.

It will be appreciated by those skilled in the art that additional steps may be further executed by the program, such as the steps that may be executed by the program as described above in the method for enhancing safety of a vehicle.

The steps of the method or algorithm described in conjunction with the exemplary arrangements disclosed herein may be embodied directly in hardware, in a software module executed by a processor, or in a combination of the two. The software module may reside in a RAM memory, a flash memory, a ROM memory, an EPROM memory, an EEPROM memory, a register, a hard disk, a removable disk, a CD-ROM, or any other form of storage medium known in the art. An exemplary storage medium is coupled to a processor such that the processor can read and write information from/to the storage medium. In an alternative, the storage medium may be integrated into the processor. The processor and the storage medium may reside in an ASIC. The ASIC may reside in a user terminal. In an alternative, the processor and the storage medium may reside in the user terminal as discrete assemblies.

In one or more exemplary exemplary arrangements, the functions described may be implemented in hardware, software, firmware, or any combination thereof. If implemented as a computer program product in software, the functions may be stored on or transmitted over a computer-readable medium as one or more instructions or code. The computer-readable medium includes both a computer storage medium and a communication medium including any medium that facilitates transfer of a computer program from one place to another. The storage medium may be any available medium that can be accessed by a computer. By way of example, without limitation, such a computer-readable medium may include a RAM, a ROM, an EEPROM, a CD-ROM or other optical disk storage, magnetic disk storage or other magnetic storage devices, or any other media that can be used to carry or store suitable program code in the form of instructions or data structures and that can be accessed by a computer. Any connection is also properly termed a computer-readable medium. For example, if the software is transmitted from a web site, a server, or other remote sources using a coaxial cable, a fiber optic cable, a twisted pair, a digital subscriber line (DSL), or wireless technologies such as infrared, radio, and microwaves, the coaxial cable, the fiber optic cable, the twisted pair, the DSL, or the wireless technologies such as infrared, radio, and microwaves are included in the definition of the medium. The disk and disc as used herein include a compact disc (CD), a laser disc, an optical disc, a digital versatile disc (DVD), a floppy disk, and a blu-ray disc, where the disk is often used to magnetically reproduce data, and the disc is used to optically reproduce data by using laser light. A combination of the above should also be included within the range of the computer-readable medium.

Although the present disclosure is disclosed above with exemplary arrangements, the exemplary arrangements are not intended to limit the present disclosure. Any person skilled in the art can make possible changes and alterations without departing from the spirit and scope of the present disclosure. Therefore, any alteration, equivalent change and modification made to the above exempalry arrangements in accordance with the technical substance of the present disclosure without departing from the content of the technical solutions of the present disclosure shall fall within the scope of protection defined by the claims of the present disclosure.

The invention claimed is:

1. A safety system for improving road compatibility of a vehicle, wherein the safety system is configured to improve the road compatibility of the vehicle and capable of controlling an external airbag of the vehicle, and comprises:
    a monitoring system comprising:
        a vehicle external information monitoring module configured to monitor an obstacle around a vehicle body; and
        a vehicle body posture monitoring module configured to monitor vehicle body motion and a vehicle body posture; and an integrated safety domain control unit configured to compute a collision condition between the vehicle and the obstacle based on data acquired by the vehicle external information monitoring module and the vehicle body posture monitoring module, the collision condition comprising a collision relative speed and a collision overlap rate, and determine, based on the collision relative speed and the collision overlap rate, whether to deploy the external airbag, wherein a determination condition for controlling triggering of deployment of the external airbag comprises determining whether the collision relative speed is less than a first speed threshold and/or whether the collision overlap rate is less than a first overlap rate threshold; and
    wherein the monitoring system further comprises an in-vehicle monitoring module configured to acquire mental state data of a driver in the vehicle; and the integrated safety domain control unit computes, based on the mental state data and the data that is acquired by the vehicle external information monitoring module and the vehicle body posture monitoring module, a possibility that the driver notices a collision with the obstacle, and computes the collision condition based on the possibility.

2. The safety system of claim 1, the determination condition for controlling triggering of deployment of the external airbag further comprises determining whether deployment of the external airbag in the collision condition reduces damage to the vehicle; and if the deployment of the external airbag in the collision condition does not reduce damage to the vehicle, the integrated safety domain control unit controls the external airbag to prevent deployment.

3. The safety system of claim 1, wherein the integrated safety domain control unit is further configured to give an alarm prompt, and if the possibility is less than an alarm threshold, the integrated safety domain control unit outputs an alarm signal, to increase the possibility that the driver notices a collision with the obstacle.

4. The safety system of claim 1, wherein the in-vehicle monitoring module comprises a camera and/or an in-vehicle radar.

5. The safety system of claim 4, wherein the mental state data comprises one or a combination of health state data and facial data of the driver in the vehicle.

6. The safety system of claim 1, wherein the monitoring system further comprises an Internet of Vehicles module, and the Internet of Vehicles module together with the vehicle external information monitoring module provides information about the obstacle around the vehicle.

7. The safety system of claim 1, wherein the vehicle external information monitoring module comprises one or a combination of a millimeter wave radar, an ultrasonic radar, a laser radar, and an external camera.

8. The safety system of claim 1, wherein the vehicle body posture monitoring module comprises a speed sensor, a yaw velocity sensor, and a steering wheel angle sensor, wherein the speed sensor is configured to monitor the vehicle body motion, and the yaw velocity sensor and the steering wheel angle sensor are configured to monitor the vehicle body posture.

9. The safety system of claim 1, wherein the integrated safety domain control unit obtains, through computation, a monitoring area based on data acquired by the vehicle body posture monitoring module, and the vehicle external information monitoring module monitors only an obstacle in the monitoring area.

10. The safety system of claim 1, wherein the integrated safety domain control unit is further configured to model an obstacle based on monitoring information of the vehicle external information monitoring module, model the vehicle body based on monitoring information of the vehicle body posture monitoring module, and compute the collision condition based on modelling information.

11. A method for improving road compatibility of a vehicle, wherein the vehicle comprises an external airbag, and the method comprises:
monitoring an obstacle around the vehicle and acquiring data of the obstacle around the vehicle;
monitoring vehicle body motion and a vehicle body posture, and acquiring vehicle body posture data and vehicle body motion data;
computing a collision condition between the vehicle and the obstacle based on the data of the obstacle around the vehicle, the vehicle body motion data, and the vehicle body posture data, the collision condition comprising a collision relative speed and a collision overlap rate; and
determining, based on the collision relative speed and the collision overlap rate, whether to deploy the external airbag, wherein a determination condition for controlling triggering of deployment of the external airbag comprises: if the collision relative speed is less than a first speed threshold and/or the collision overlap rate is less than a first overlap rate threshold, controlling the external airbag to prevent the external airbag from deploying, instead of triggering the external airbag to be deployed; and monitoring a mental state of a driver in the vehicle, and acquiring mental state data of the driver in the vehicle; and computing, based on the state data, the data of the obstacle around the vehicle, the vehicle body motion data, and the vehicle body posture data, a possibility that the driver notices a collision with the obstacle, and computing the collision condition based on the possibility.

12. The method for improving road compatibility of the vehicle of claim 11, wherein the determination condition for controlling triggering of deployment of the external airbag further comprises determining whether deployment of the external airbag in the collision condition reduces a damage value to the vehicle; and if the deployment of the external airbag in the collision condition does not reduce the damage value to the vehicle, controlling the external airbag to prevent deployment.

13. The method for improving road compatibility of the vehicle of claim 11, wherein the monitoring an obstacle around the vehicle comprises monitoring whether the obstacle exists around the vehicle, identifying a type of the obstacle, and predicting movement of the obstacle.

14. The method for improving road compatibility of the vehicle of claim 11, wherein the method further comprises: recording and uploading the collision condition to a cloud database.

15. A non-transitory machine-readable medium, having a computer program stored thereon, wherein the program is executed by a processor to implement the following steps:
computing a collision condition between a vehicle and an obstacle based on data of the obstacle around the vehicle, vehicle body motion data, vehicle body posture data, and a possibility that a driver notices a collision with an obstacle based on mental state data of the driver in the vehicle that are input, the collision condition comprising a collision relative speed, and a collision overlap rate; and
determining, based on the collision relative speed, the collision overlap rate, and the possibility that the driver notices the collision with the obstacle, whether to trigger deployment of an external airbag, wherein a determination condition therefor comprises: if the collision relative speed is less than a first speed threshold and/or the collision overlap rate is less than a first overlap rate threshold, controlling the external airbag to prevent deployment, instead of triggering the external airbag to be deployed.

16. A safety system for improving road compatibility of a vehicle, wherein the safety system is configured to improve the road compatibility of the vehicle and capable of controlling an external airbag of the vehicle, and comprises:
a monitoring system comprising:
a vehicle external information monitoring module configured to monitor an obstacle around a vehicle body; and
a vehicle body posture monitoring module configured to monitor vehicle body motion and a vehicle body posture; and an integrated safety domain control unit configured to compute a collision condition between the vehicle and the obstacle based on data acquired by the vehicle external information monitoring module and the vehicle body posture monitoring module, the collision condition comprising a collision relative speed and a collision overlap rate, and determine, based on the collision relative speed and the collision overlap rate, whether to deploy the external airbag, wherein a determination condition for controlling triggering of deployment of the external airbag comprises determining whether the collision relative speed is less than a first speed threshold and/or whether the collision overlap rate is less than a first overlap rate threshold;

wherein the integrated safety domain control unit is further configured to model an obstacle based on monitoring information of the vehicle external information monitoring module, model the vehicle body based on monitoring information of the vehicle body posture monitoring module, and compute the collision condition based on modelling information; and wherein the safety system further comprises a cloud database and a simulation database, wherein the cloud database is configured to provide historical data of a collision between an obstacle and the vehicle, and the simulation database is configured to provide simulation data of a collision between an obstacle and the vehicle based on the modelling information; and the integrated safety domain control unit computes the collision condition based on the historical data and the simulation data.

* * * * *